(12) United States Patent
Farrokhi et al.

(10) Patent No.: US 10,126,429 B2
(45) Date of Patent: *Nov. 13, 2018

(54) METHOD AND APPARATUS FOR DETERMINING DEVICE LOCATION

(71) Applicant: ETHERWHERE CORPORATION, Sunnyvale, CA (US)

(72) Inventors: Farrokh Farrokhi, San Ramon, CA (US); Edmund Gregory Lee, Palo Alto, CA (US); Dickson Wong, Burlingame, CA (US)

(73) Assignee: ETHERWHERE CORPORATION, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/815,861

(22) Filed: Mar. 15, 2013

(65) Prior Publication Data

US 2016/0154116 A1    Jun. 2, 2016

(51) Int. Cl.
*G01S 19/24* (2010.01)
(52) U.S. Cl.
CPC ................ *G01S 19/246* (2013.01)

(58) Field of Classification Search
CPC .......... G01S 19/42; G01S 19/30; G01S 19/24; G01S 19/246
See application file for complete search history.

(56) References Cited

U.S. PATENT DOCUMENTS

| | | | | |
|---|---|---|---|---|
| 5,452,211 A * | 9/1995 | Kyrtsos | ........ | G01S 19/49 342/357.24 |
| 6,347,113 B1 * | 2/2002 | Hatch | ........ | G01S 19/22 375/149 |
| 9,207,329 B2 * | 12/2015 | Farrokhi | ........ | G01S 19/29 |
| 2004/0257277 A1 * | 12/2004 | Abraham | ........ | G01S 5/0036 342/357.59 |
| 2006/0082496 A1 * | 4/2006 | Winternitz | ........ | G01S 19/14 342/357.63 |
| 2009/0285268 A1 * | 11/2009 | Gildea | ........ | G01S 19/24 375/149 |
| 2010/0117897 A1 * | 5/2010 | Riley | ........ | G01S 19/25 342/357.65 |
| 2010/0279732 A1 * | 11/2010 | Hjelm | ........ | G01S 19/06 455/552.1 |

* cited by examiner

*Primary Examiner* — Gregory C. Issing
(74) *Attorney, Agent, or Firm* — Haynes and Boone, LLP

(57) ABSTRACT

A satellite-based positioning receiver is provided that is configured to combine non-concurrent sets of pseudoranges all taken at a common location to determine at least a 2D position of the common location.

3 Claims, 15 Drawing Sheets

METHOD AND APPARATUS FOR DETERMINING DEVICE LOCATION

BACKGROUND OF THE INVENTION

This invention relates to techniques for determining location and, specifically, to techniques that utilize satellite-based Global Positioning Systems (GPS) or Global Navigational Satellite Systems (GNSS).

Satellite-based positioning systems (SPSs), including the NAVSTAR Global Positioning System (GPS), developed by the United States Department of Defense, as well as the GLONASS and Galileo GPS systems, use a constellation of satellites that transmit precise microwave signals, which allows the SPS receivers to determine their current location. Initial applications were predominantly military; the first widespread consumer application was navigational assistance.

With the explosive growth in mobile communications devices, a new wave of location-based applications is emerging. These applications are characterized by a requirement for device-centered maps. One example is a form of "Yellow Pages" in which a map centered at the location of the mobile device presents user-selected establishments (e.g., barber shops) in situ. Another example would be an application enabling one to locate, on a device-centered map, members of his or her social network. Unlike navigational assistance, these emerging applications running on mobile devices are often intended to be used weak-signal environments such as inside buildings or in "urban canyons" in which the received satellites signal are too weak to provide a position fix.

For example, conventional GPS receivers are unable to obtain location coordinates in indoor and urban canyon locations, especially in cold start operation. To get a position fix, a GPS receiver requires navigational data for the satellites. This navigational data includes the ephemeris data for each visible satellite (which includes its position in space as well as its speed). Traditionally, this navigational data is modulated onto the GPS signal itself (it is commonly called the "nav bits"). But this navigational data transmission is very low bandwidth (e.g., 50 bits/second). Should a GPS receiver be powered up in a "cold start" in which it has no (or incomplete) knowledge of its location and the visible satellites, the acquisition of the required navigational data can take up to 15 minutes. But GPS technology is now commonplace in cellular telephones, which provides a shortcut. The base station can transmit all the "nav bits" to the handset. Such assistance goes by a number of names such as "extended ephemeris." In this fashion, a handset can immediately know which satellites are visible and what their ephemeris is. Extended ephemeris thus markedly reduces the time to first fix (TTTF). But even with extended ephemeris, the GPS receiver must still acquire the satellite signals. Extended ephemeris does nothing about boosting unacceptably weak GPS signals in indoor and urban canyon locations.

There is thus a need in the art for systems and techniques that solve the problem of acquiring SPS signals in weak-signal environments. This need in the art is exacerbated by the explosive growth of location-based social media and other applications that are often used indoors or in other weak-signal environments.

To better understand the problems of faced by SPS receivers in weak-signal environments, a brief tutorial will be provided. In particular, the operation of a NAVSTAR GPS receiver will be discussed. But it will be appreciated that the concepts and principles disclosed herein are widely applicable to other types of SPS receives. Each GPS satellite transmits signals containing its unique identity, its three-dimensional coordinates, and the time stamp of when the signal was sent. Each satellite also transmits data pertaining to the location of the other satellites in the constellation, commonly referred to as almanac data, which are utilized by navigation equations. FIG. 1a is an illustration of the data structure of the signal broadcast by each satellite, which is a phase-modulated carrier. The phase-modulation includes a coarse acquisition (C/A) code. Each satellite has its own unique C/A code, which is a binary code 1023 bits long. Each bit in the C/A code sequence is typically denoted as a "chip" since it does not represent data. The chips are transmitted at a 1.023 MHz rate such that each C/A code sequence has a period of 1 millisecond (ms). The C/A code is a pseudo random number (PRN), which looks like a random code but is clearly defined for each satellite.

In addition to the C/A code, the transmitted signal includes the 50 Hz navigational signal overlay that provides the location of each satellite, clock corrections, and other system parameters. The 50 Hz signal is often referred to as the GPS navigation message. As shown in FIG. 1a, a navigational bit is a phase overlay on twenty consecutive C/A codes. At the navigation bit boundary, the phase overlay either flips (going from +1 to −1 or from −1 to +1) or stays the same. As will be discussed further herein, such a phase transition is problematic with regard to coherently integrating or summing the cross-correlations for a series of PRN sequences that extends over the navigation bit boundaries. For example, if one navigation bit is +1 and the subsequent navigation bit is −1, the coherent integration of the cross-correlations for the PRN sequences for the first navigation bit is opposed by the coherent integration over the subsequent navigation bit. The GPS navigation message, in combination with the acquired pseudo ranging information from the C/A codes, is used to complete the navigation equations, which determine the location coordinates of the GPS receiver. The navigation bits themselves are is divided into 25 frames, each having a length of 1500 bits (meaning an interval of 30 seconds for transmission). FIG. 1b illustrates a frame of the complete signal.

To obtain a "pseudorange" to a given satellite, a GPS receiver correlates a copy of a satellite's unique PRN sequence with the received PRN sequence. The copy is correlated with regard to each chip position. In other words, prior to acquiring the satellite signal, an SPS receiver does not know which chip position corresponds to the arrival time for the received PRN sequence. The pseudo-random nature of PRN sequence is quite advantageous in that received noise is effectively de-correlated by such a code. But if the copy of the PRN sequence is properly aligned with the received PRN sequence in a cross-correlation, all the chips coherently add together. But the noise cannot coherently add. The received signal is then "pulled" out of the noise by the gain of all the chips adding together. This correlation peak occurs for one of the possible chip alignments of the received PRN sequence with the replica PRN sequence. The received PRN sequence is then located in time—its arrival time is known. But an SPS receiver must also search in frequency as well due to Doppler shift and local oscillator (LO) uncertainties. Once the received PRN sequence is located in time and frequency, the SPS receiver can obtain a "pseudorange" between it and the transmitting satellite. This pseudorange is based upon the time the satellite transmitted the PRN sequence and the time of reception by the SPS receiver. Based upon this elapsed time and the fact that the satellite transmission occurred at the speed of light, the SPS receiver can calculate the range between it and the transmitting satellite. But note that the satellite has a very accurate atomic clock. So there is relatively little uncertainty to the reported transmission time by the satellite. In contrast, the SPS receiver will typically have a relatively inexpensive clock, which is substantially less accurate than the satellite clock. The SPS receiver clock thus has an unknown offset to the satellite clock. For this reason, the time the SPS receiver believes it received the PRN sequence is not the 'true" time that it would have calculated if it had a more accurate clock that matched the time clocked by the expensive satellite clock. This unknown clock offset adds uncertainty to the range measurement, hence it is denoted as a pseudorange.

Referring now to FIG. 2a, an SPS receiver knows the transmitting satellite's position from the associated ephemeris (whether that ephemeris was taken from the nav bits or was received in an extended ephemeris scheme). For example, the position of a satellite A 11 and a satellite B 12 is known. A pseudorange A 13 from satellite A forms a sphere about the satellite's position. If the SPS receiver were not earth-bound, it could be anywhere on the sphere. But if we assume that the SPS receiver is on the earth's surface, the pseudorange defined sphere intersects the earth's surface in a circular fashion as shown in FIG. 2a. A similar pseudor-ange-defined sphere about satellite B with regard to its pseudorange 14 produces another circular intersection. Since the SPS receiver is on the earth's surface (or if we assume so), it will then be located at the resulting intersection points 15 and 16, resulting in an ambiguous location. An SPS receiver thus needs more than just a pair of pseudor-anges to get a position fix.

The clock offset uncertainty that affects location determination may be better understood with reference to FIG. 2b, which illustrates the result of the two acquired satellites SAT A 11 and SAT B 12 when the clock in SPS receiver 10 is 2 milliseconds late as compared to the clock of the SPS satellites. This causes the travel-time of the transmitted signals to appear to be 2 milliseconds longer than it actually is. The dotted ovals represent the actual range, Range_A 13 and Range_B 14, whereas the pseudoranges include this 2 ms clock offset. As the transmitted signals travel at the speed of light, even a small clock offset translates into large inaccuracies. Since atomic clocks are not a practical solution for SPS receivers, the problem is solved using an additional pseudorange.

FIG. 2c illustrate the intersections of a third pseudorange 22 with respect to a satellite C 21 with the pseudoranges from FIG. 2b. The pseudoranges all have the same clock offset because they are based they are based upon the same reception times in one SPS receiver. The three intersection points resulting from the three pseudoranges intersect at point 19, point 23 and point 24. From the intersection points, the clock offset is calculated by adjusting the clock offset until the three intersection points merge to a single point. Once this is completed, the clock of the SPS receiver has been synchronized with the atomic clock of the SPS satellite system. This is a 2-dimensional location as this point represents the intersection of the adjusted pseudoranges on the surface of the Earth. Additionally, acquiring a fourth concurrent satellite, resulting in a fourth concurrent pseudor-ange, will allow for a 3-dimensional location coordinate to be determined. Our attention now will switch to the process by which pseudoranges from individual satellites in the constellation are acquired, as it represents the most challenging aspect of obtaining the location coordinates of a GPS receiver. As described above, each SPS satellite broadcasts its unique identity via its particular PRN sequence (e.g., GPS uses a C/A code). The PRN sequence for each satellite is known by the SPS receiver, which compares it with the received composite signal. FIG. 3 shows a block diagram of a conventional SPS receiver. The composite signal from the SPS satellite constellation 30 is received by the RF front end 25, which down-converts the RF signal and converts it to a digital signal stream. The digital signal stream is input to the correlator block 26. Correlator block 26 correlates the incoming digital signal with the PRN sequence replica 29 stored in memory for each SPS satellite.

FIG. 4 illustrates how correlator 26 determines the receive or arrival time of the signal from an SPS satellite by using the well-understood process of cross correlation. Even with a clear view of the sky, received signals are weak and all satellites broadcast over the same carrier frequency. Most SPS receivers implement multiple correlator blocks in parallel in order to acquire pseudoranges from multiple satellites simultaneously. For the purpose of this discussion, we will focus on the operation of a single correlator block. The composite digital signal that is received by the SPS receiver is input to a delay line made up of multiple delay elements. Corresponding chips (unit of the spreading code) from a PRN sequence replica 29 for the specific satellite that is being acquired are multiplied with the output of each delay element. The product of each delayed signal and chips from the PRN sequence replica 29 are summed and processed in a coordinate generator 28.

FIGS. 5 and 6 illustrates the correlator output of correlator 26 for different received signal powers. In FIG. 5, the received PRN sequence strength or SNR was such that correlator peaks representing the chip corresponding to the arrival time are greater than the noise floor, including peaks representing both white Gaussian noise as well as transmitted signal from a SPS satellite going through a multipath channel. This allows for the successful acquisition of the satellite. The received signal advances through the correlator delay line elements a chip at a time at the chip rate (1.023 MHz). The received PRN sequence will thus only align with the replica PRN sequence every n chips, where n is the number of chips in a complete PRN sequence. For example, n is 1023 in a GPS system such that the PRN sequence period is a millisecond. If the received signal is sufficiently powerful (it can actually be quite weak due to the power of coherently adding 1023 chips), a correlation peak occurs as shown in FIG. 5 that will repeat every 1 ms. This peak corresponds to the arrival time of a complete C/A code from the transmitting satellite, albeit with the clock offset uncertainty. The corresponding transmission time of the GPS signal is determined based on the time-stamp of the transmitted signal to determine the transmission delay, which is then converted according to the speed of light into a pseudorange in coordinate generator 28. When this information is acquired from four or more concurrent satellites, coordinate generator 28 employs the resulting navigational equations to determine the location coordinates of a GPS receiver (or three acquired concurrent satellites for a two-dimensional coordinate).

In practice, the process of cross correlation is much more involved. For example, movement of an SPS receiver relative to the individual satellites causes Doppler shifts. But more significantly, especially when the GPS receiver is located in a weak-signal environment such as indoor or urban canyon locations, path losses and signal multi-path significantly reduce the signal-to-noise ratio of the received signal, limiting the ability to successfully determine the signal travel-time distance and thus any ranging information between the satellite and the GPS receiver. In other words, the cross-correlation process would not yield any discernible peaks. FIG. 6 illustrates the correlator output in such a weak-signal environment. In this case, the correlator peaks are not distinguishable because they do not rise above the noise floor. Because the correlator peaks cannot be identified, it is not possible to determine the travel time necessary to determine the pseudorange information. There can be no position fix in such a weak-signal environment unless further processing is involved as discussed herein.

It is well known that increasing the signal-to-noise ratio via processing gain, and thus improving the ability to acquire the transmitted signals, can be achieved by coherently adding the cross-correlations for a series of PRN sequences. However, in practice, there are many significant technical challenges to increasing the processing gain and receive sensitivity by increasing the processing time. The gain from such coherent integration in conventional SPS receivers saturates at well under twenty PRN sequences (20 milliseconds in a GPS system). This explains the poor indoor and urban-canyon performance of current SPS receivers. There are a number of reasons that limit the coherent correlation times. First, as discussed above, the navigation data overlay such as the 50 Hz data overlay in a GPS system creates a structural boundary at every navigation symbol boundary (every 20-millisecond interval for GPS). As also mentioned earlier, the local clock used in SPS receivers is relatively inaccurate. When correlation times are increased, the clock drift during the length of the correlation period is large enough to degrade processing gain. In addition, all SPS satellite transmissions have a Doppler shift that depends upon their particular location in space relative to the SPS receiver. Moreover, if the SPS receiver is not stationary, its own motion compounds the satellite-motion-induced Doppler shift on the received satellite transmission. Another significant barrier is that SPS receivers are subject to low frequency fading, especially in indoor and urban-canyon locations. Low frequency fading refers to the variation of received signal strength from each satellite in the order of less than 10 Hz. This is due to the variation of signal blockers in line of sight of each of the satellites in the constellation. Movement of people and equipment also contribute to the variation of fading characteristics for each satellite signal. The signal fading significantly lowers the probability of the signals being acquired from a sufficient number of concurrent satellites to determine a position fix. Given these issues, the channel de-correlates both spatially and temporally.

A prior art example of an attempt to extend processing time beyond the navigation data symbol boundary such as the 50 Hz overlay boundary in GPS is Krasner (U.S. Pat. No. 6,016,119). FIG. 6 illustrates a block diagram depiction of aspects described by Krasner. Multiple correlator blocks are employed to process signals spanning multiple 50 Hz overlay boundaries. In order to account for the unknown values of the 50 Hz overlay signal, the output from each correlator block is squared, removing the sign. The squaring function removes the 50 Hz phase information, resulting in incoherent processing and significantly limiting the processing gain. As a consequence, this technique is not currently being practiced in commercially available products.

Accordingly, there is a need in the art for improved satellite-based position system (SPS) signal processing techniques for weak-signal environments.

SUMMARY

An improved signal processing technique is disclosed that advantageously addresses the issues that have vexed previous attempts to coherently integrate a sufficient number of received PRN sequences to acquire a received satellite signal in weak-signal environments. In that regard, it is well known that coherent integration extended over navigation data symbol boundaries must account for the navigation data modulation overlaid onto each group of PRN sequences that forms a given navigation data symbol or baud. To remove this navigation data modulation, the replica PRN sequence should have the conjugate of the navigation data modulation overlay on the corresponding received PRN sequence. In a GPS system, the baseband signal is real (ignoring the effects of noise). Given this real value for the baseband, the navigation data modulation is just a reversal of sign. There is no complex value to conjugate in such a case. But in other SPS systems such as Galileo, the baseband signal (after removal of the carrier) is a complex signal. The applied data navigation is also complex in such a case. Thus, there is a complex value to conjugate for a Galileo replica PRN sequence.

In that regard, the principles and concepts disclosed herein are independent of the particular phase modulation used in a given SPS format. It will be assumed that the replica PRN sequences used herein have the conjugate of the navigation data modulation applied to the corresponding received PRN sequences. As used herein a replica PRN sequence with the appropriate conjugated navigation data symbol modulation is referred to as a "perfect reference" PRN replica sequence.

In a coherent addition of cross-correlations for received PRN sequences with their perfect reference PRN replica sequences, the phase modulation for the navigation data symbols is removed while preserving phase within each cross-correlation. The preservation of phase is of course implicit in a coherent integration. For example, as discussed earlier, one way to integrate across navigation data symbol boundaries in a GPS receiver is to square each individual PRN sequence cross-correlation. While such an operation removes the navigation data phase modulation, it destroys the phase information for that correlation.

In a NAVSTAR system, the perfect replicas are quite convenient since there is no complex value to conjugate. A perfect replica PRN sequence is just the replica PRN sequence but modulated with the appropriate navigation bit overlay. One can thus appreciate that the use of perfect replicas enables an SPS receiver to readily coherently integrate across navigation symbol boundaries. But conventional attempts to coherently integrate using such replicas have failed for reasons that have heretofore not even been recognized, let alone addressed. The following discussion will discuss these heretofore unrecognized issues and provide a remarkably advantageous SPS signal processing technique to address them.

In a time-domain embodiment of this technique, the sampled PRN sequences or the corresponding samples of the perfect replica PRN sequences are resampled to either increase or decrease the resulting effective sampling rate. In other words, a buffer stores the original time samples of the received PRN sequences (or the original samples of the perfect reference PRN replica sequences). These stored time samples are processed to either increase or decrease an effective sampling rate to produce sets of samples, each sample set corresponding to a given effective sampling rate. For example, a range of effective sampling rates can be tested. The stored time samples are resampled according to each tested sampling rate to produce a corresponding resampled set of time samples. If the received PRN sequences are re-sampled, the corresponding resampled sets of time samples can then be cross-correlated with the appropriate perfect replica PRN sequences and coherently summed to form a candidate cross-correlation result. Alternatively, the re-sampled sets for the perfect reference PRN replica sequences may be cross-correlated with the original time samples of the received PRN sequences and coherently summed. Conventional cross-correlation acquisition techniques as known in the satellite-based positioning system arts may then be applied to the cross-correlations sums to determine if a specific re-sampling (or perhaps the original sampling itself) corresponds to an acquisition (knowledge of the arrival times for the received PRN sequences). The search for the acquisition need not be done in parallel. In other words, the cross-correlation can be performed and tested for a given effective sampling rate before the re-sampling is performed for other effective sampling rates in the search range.

In an alternative embodiment, the original time samples for a received series of PRN sequences are not resampled but instead filtered in the frequency domain prior to their cross-correlations and coherent additions so that a time scale for the original time samples matches a time scale for the perfect replicas. Such frequency-domain-performed re-sampling may instead be applied to the samples of the perfect reference PRN replica sequences.

In yet another alternative embodiment, methods and apparatus are disclosed to process non-concurrent sets of pseudoranges. Each set of pseudoranges comprises at least a pair or concurrent pseudoranges. The non-concurrent sets of pseudoranges are all with regard to a common location. To determine that the non-concurrent sets of pseudoranges were all calculated with regard to a common location, each pseudorange set is associated with wireless proxy for position. For example, the wireless proxy may comprise a plurality of received signal strengths from WiFi APs. If one pseudorange set has a substantially similar wireless proxy to another pseudorange set, it may be assumed that these sets are all associated with a common location. This is quite advantageous because a receiver such as a handset could merely report to a remote server the current wireless proxy it is receiving concurrent to the calculation of a set of pseudoranges. Alternatively, the handset could simply provide the samples of the received PRN sequences along with the wireless proxy to the remote server.

The remote server may have a database of previously-reported wireless proxies and their associated pseudorange sets. In this fashion, the remote server may compare the wireless proxy from a receiver to find substantially similar wireless proxies and retrieve the corresponding non-concurrent pseudorange sets.

DETAILED DESCRIPTION

Figure 1A:
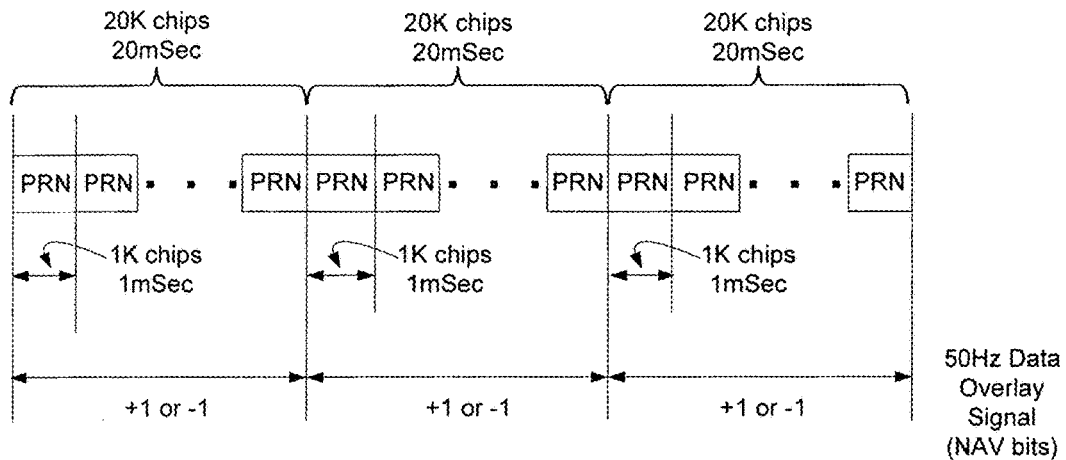
FIGS. 1a and 1b shows the prior art data structure of transmissions of the NAVSTAR Global Navigation Satellite System.
Figure 1B:
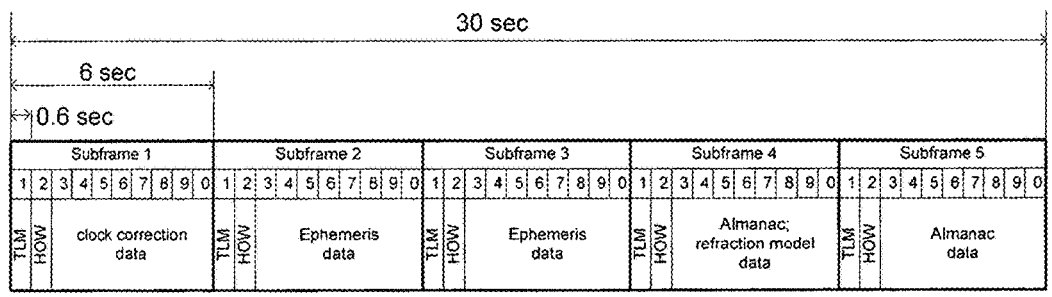
Figure 2A:
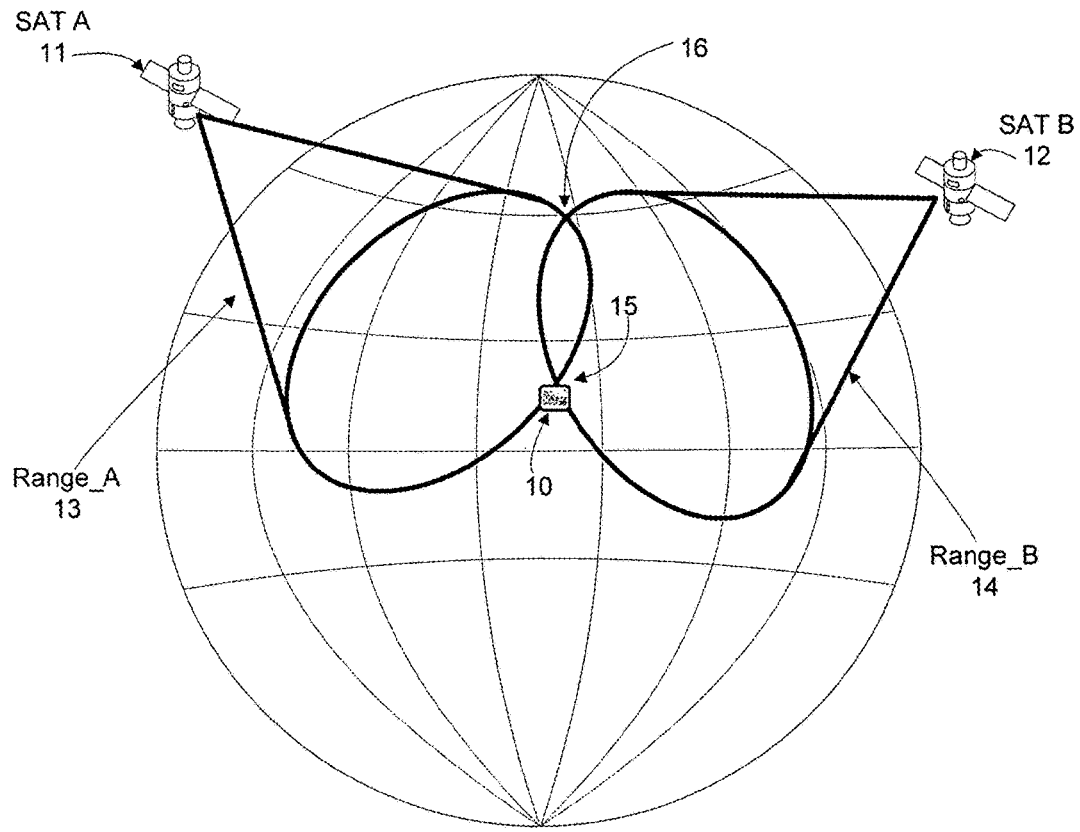
FIGS. 2a, 2b and 2c are operational descriptions of a Global Navigation Satellite System.
Figure 2B:
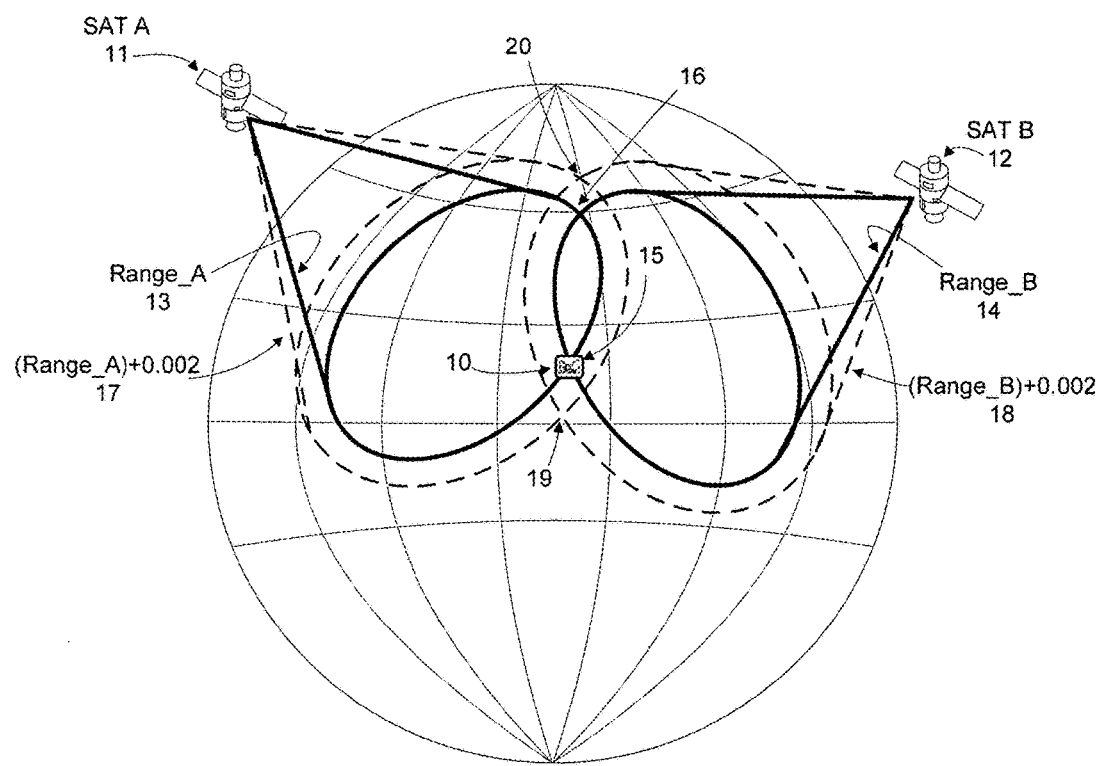
Figure 2C:
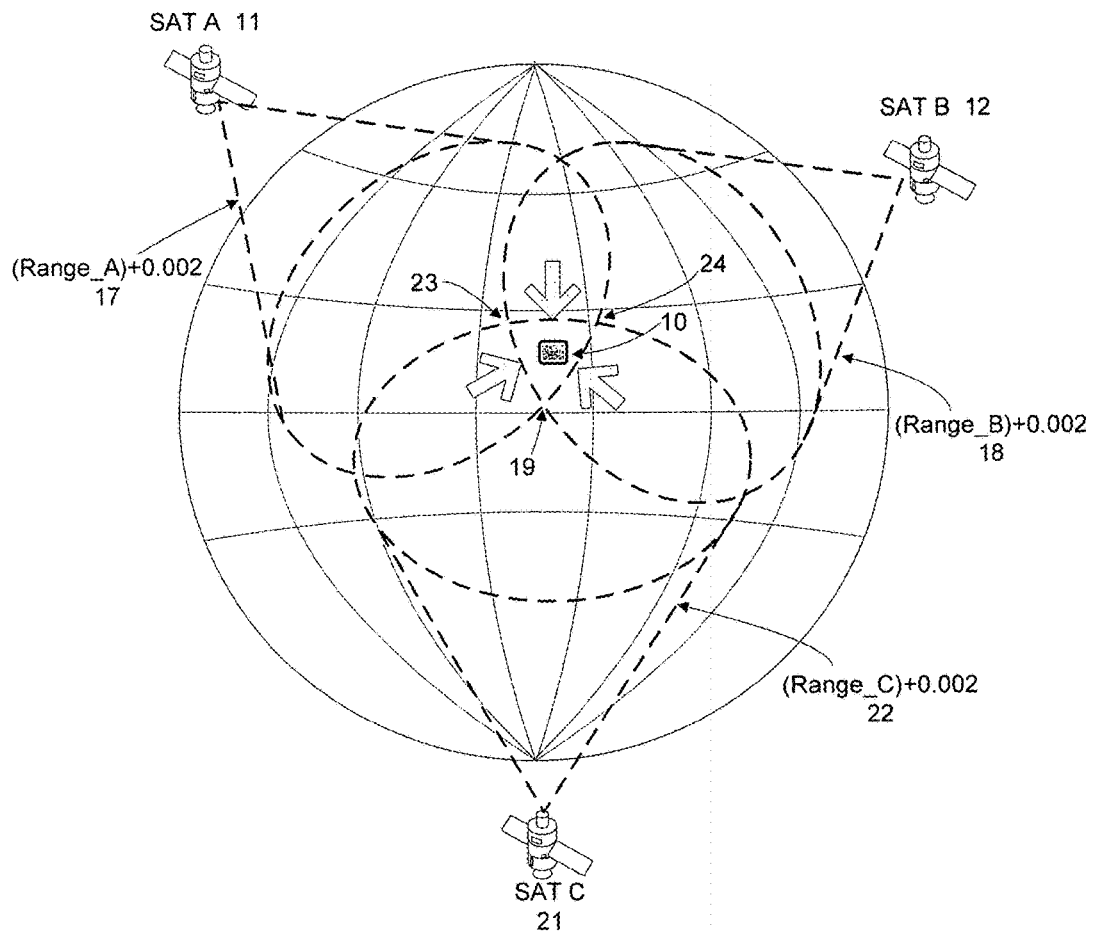
Figure 3:
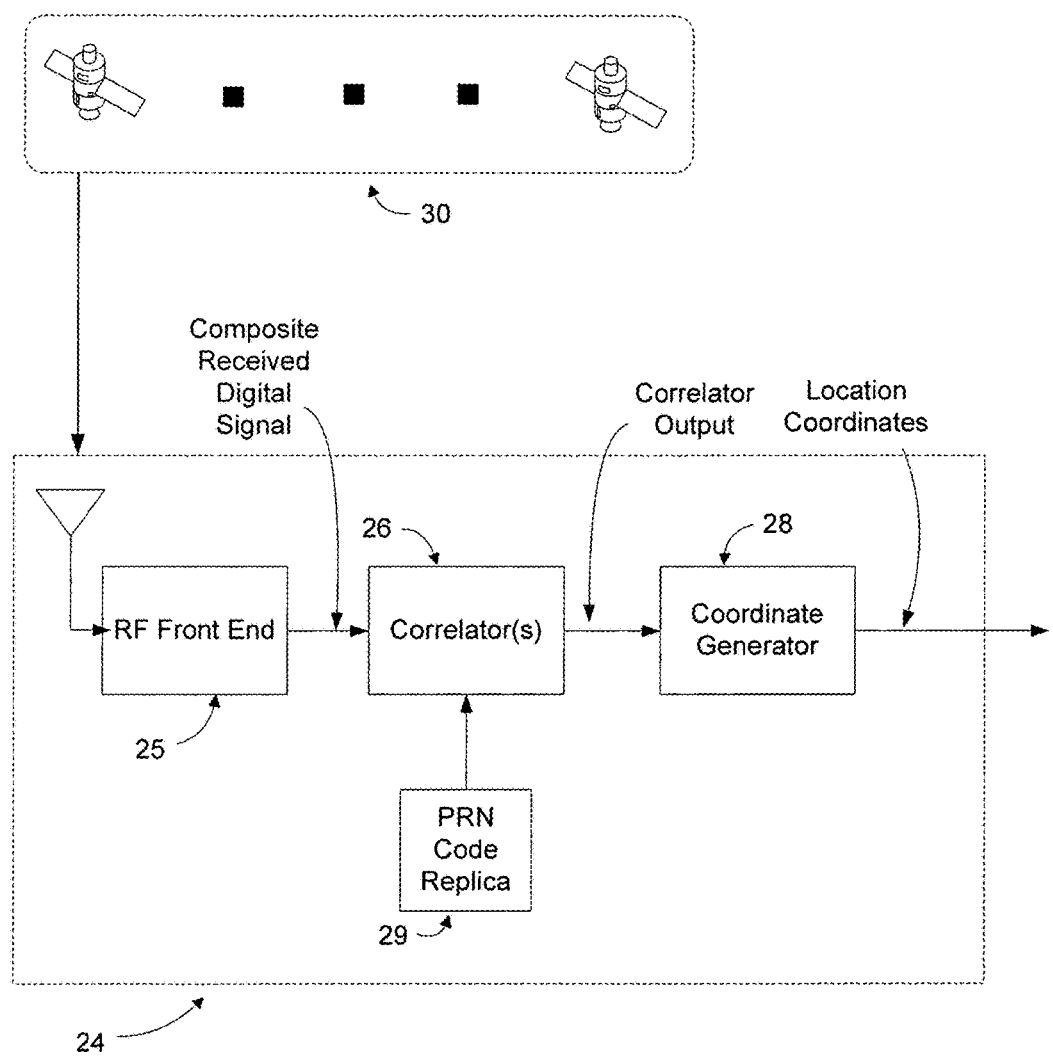
FIG. 3 describes a block diagram of a prior art GPS receiver.

To address the need in the art for improved SPS receiver performance in weak-signal environments, the previously-unrecognized issues that inhibit weak-signal acquisition will first be discussed. An SPS receiver architecture and corresponding SPS signal processing techniques will then be introduced and discussed to address these issues.

As discussed previously, it is known that the coherent addition of cross-correlations of received PRN sequences with corresponding replica PRN sequences will provide little to no benefit if the phase modulation for the navigation data symbols in a given SPS format is not accounted for. For example, in the case of NAVSTAR, the navigation data symbol comprises 20 consecutive PRN sequences that are modulated with a binary phase modulation scheme (each navigation data symbol thus being a navigation bit). If the replica PRN sequences do not account for this phase modulation, coherent cross-correlation of a series of received PRN sequences comprising consecutive navigation bits of opposite phase will involve destructive interference—one would be better off simply performing a conventional cross-correlation of a single received PRN sequence.

The replica PRN sequences disclosed herein may be phase modulated responsive to a conjugation of the applied navigation data symbol phase modulation on the corresponding received PRN sequences to form perfect reference PRN replica sequences such that the cross-correlation for each individual received PRN sequence is coherent yet the applied navigation data symbol phase modulation is removed.

In a NAVSTAR system, the perfect replicas are quite convenient since 1*1 equals −1*−1. In other words, the perfect replica PRN sequences have the same navigation bit phase modulation as used by the corresponding received PRN sequences. For example, if a given received PRN sequence is part of a zero-degree-phase-shifted navigation bit, the corresponding perfect replica PRN sequence has no phase shift as well. But if a given received PRN sequence is part of a 180-degree-phase-shifted navigation bit, the corresponding perfect replica PRN sequence also has such a 180 degree phase shift relative to an unshifted perfect replica. But the perfect replica in SPS systems in which the navigation data symbol phase modulation schemes produce complex values would not have the same phase modulation as used by the corresponding received PRN sequence. Instead, the conjugate is applied as discussed above.

Although the prior art never used the term "perfect replica" as used herein, it was known that the navigation data symbol modulation needed to be accounted for if an SPS receiver were to coherently cross-correlate a series of received PRN sequences with replica PRN sequences. In that regard, it is abundantly well known in the signal processing arts that the signal-to-noise ratio (SNR) for a weak received signal can be improved through extended coherent integration. If a received SPS sequence is too weak to provide a detectable cross-correlation peak on its own, it is thus well known that coherently cross-correlating a sufficient number of such received SPS sequences with the appropriate PRN replica sequences might provide a detectable cross-correlation peak. For example, if the coherent addition of the cross-correlations for 50 received PRN sequences does not provide a sufficient SNR, then perhaps coherently adding 100, 200, 500, or even 1000 or more cross-correlations may lead to the necessary SNR for acquisition. The number of received PRN sequences that must be cross-correlated and coherently summed to achieve acquisition (a detection of a cross-correlation peak in the resulting coherent addition) is denoted herein a "sufficient series of received PRN sequences."

Despite this knowledge, conventional techniques to cross-correlate each PRN sequence in a sufficient series of received PRN sequences with the corresponding perfect replica PRN and then coherently integrate the individual cross-correlations (whether performed in the time domain or in the frequency domain) have been unsatisfactory. The gain from the coherent addition saturates—a sufficient series of received PRN sequences can never be reached, no matter how long the SPS receiver integrates. There are two main reasons for this failure. A first issue is the receiver sampling rate whereas a second issue is the Doppler shift of the received PRN sequence. The receiver sampling rate will be discussed first.

Receiver Sampling Rate

A received PRN sequence is digitized prior to its cross-correlation. This digitization occurs responsive to the receiver clock. The digitized samples thus correspond to a time frame established by the receiver clock. The SPS receiver clocks are mass produced and directed to ordinary consumers; their cost must be kept low. Of course, "you get what you paid for" so SPS receiver clocks are usually relatively inaccurate in comparison to the expensive atomic clocks used on the SPS satellites. As compared to the time established by the SPS satellites, an SPS receiver clock will tend to cycle too fast or too slow—there is a clock offset for the SPS receiver clock as compared to the true time. In that regard, no clock keeps "true" time as they all have some inaccuracy. But the inaccuracy in expensive atomic clocks such as those used in SPS satellites is extremely small. In contrast, a typical SPS receiver clock either beats too fast or it beats too slow. The sampling or digitization of the received PRN sequence is thus affected by the receiver sampling rate error.

Figure 7:
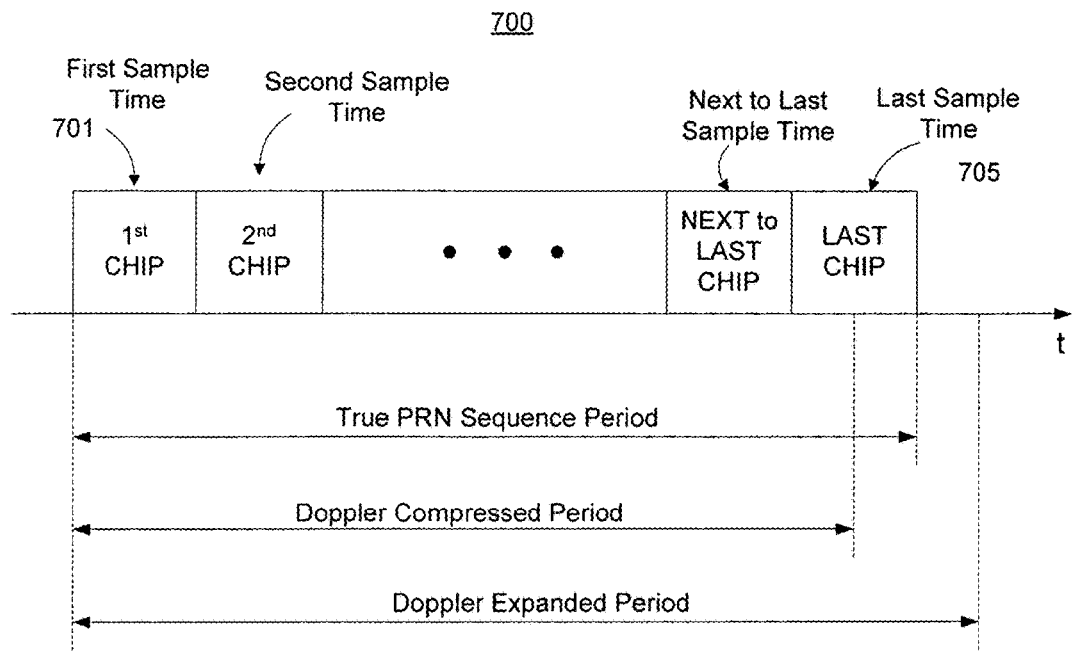
FIG. 7 illustrates the sampling of a received PRN sequence and the effects of Doppler shift.

To better appreciate the deleterious effects of the SPS receiver sampling rate error, an individual received PRN sequence 700 is shown in FIG. 7. Received PRN sequence 700 is assumed for the purposes of discussion to have no Doppler shift. The sampling rate needs to be sufficient such that each chip is sampled at least once (in reality, practical sampling schemes require multiple samples per chip). For received PRN sequence 700, the sampling rate is just once per chip as shown. The time scale for the received PRN sequence 700 is the "true" time scale since it was received with no Doppler shift whereas the samples are taken according to receiver SPS clock time frame. With regard to any given received PRN sequence such as sequence 700, the clock sampling rate error has relatively little effect. For example, suppose received PRN sequence 700 comprises 1023 chips. If sequence 700 is 1 millisecond long, then samples are taken at a rate of 1.023 MHz. A typical SPS receiver clock is accurate to around 25 ppm. Thus, instead of beating exactly at 1.023 MHz, a typical SPS receiver clock will cycle at 1.023 MHz+/−25 Hz. Suppose a first sample 701 samples exactly in the middle of the first chip. In other words, it will be assumed that first sample 701 is aligned where it should be with the true time scale despite the SPS receiver clock sampling rate error. Such a clock will then have cycled 1023 times before a last sample 705 is taken of the last chip. At an inaccuracy of 25 ppm, the time scale final sample 705 is thus offset from the true time by 25 ppm * 1023 cycles. Each chip period is approximately 1 µs long. Thus, the final sample will be offset from where it should be based upon the true time scale by approximately 2.5% of a chip. So instead of being exactly in the middle of the final chip, final sample 705 is either advanced or retarded by just 2.5% of the chip period. With regard to the timing for PRN sequence 700, such a clock sampling rate error causes no effect in the resulting cross-correlation as each chip was correctly sampled.

But suppose 40 consecutive PRN sequences are sampled with such a 2.5% chip offset at the end of each PRN sequence. By the $20^{th}$ PRN sequence, the sampling rate is one-half a chip displaced, which sharply reduces the correlation peak for this $20^{th}$ PRN sequence. By the $40^{th}$ PRN sequence, the sampling rate is a full chip displaced, which completely destroys the cross-correlation for the $40^{th}$ PRN sequence. The SPS receiver clock sampling rate error thus quickly nullifies the gain from coherent integration of multiple cross-correlations. One can thus suppose that, if only an SPS receiver were configured with an atomic clock, then this clock sampling rate error issue is solved. But it has been found that even if an atomic clock is used, the gain from coherent integration quickly flattens out—relatively little SNR is achieved no matter how long one coherently integrates despite the use of such an accurate SPS clock to time the digitization of the received PRN sequences. Such a failure is caused by the second issue, which is the Doppler shift of the received PRN sequences.

Doppler Shift

The need to account for the Doppler shift of the received SPS satellite signals is well known. In that regard, a conventional SPS receiver such as a GPS receiver will search through a number of frequency bins to acquire and track a received satellite signal. But such searching of frequency bins occurs after a received PRN sequence has been sampled. But the Doppler shift causes the same effect on the sampling as does the receiver clock sampling rate error. For example, suppose an SPS receiver has a very accurate clock such as an atomic clock. The effect of the clock drift for such a clock is negligible unless enormous numbers of PRN sequences are being cross-correlated and coherently summed. But the SPS clock accuracy cannot change the physics of the Doppler effect: the apparent period or length of a received PRN sequence is either increased or decreased by the Doppler. In other words, the time scale for the received PRN sequence is either too fast or too slow. For example, if a satellite is moving toward an SPS receiver, the Doppler shift is positive. The received PRN sequences will not have their nominal length in such a scenario but instead will be compressed in time (having a faster apparent time scale). Even if the SPS receiver clock ticks perfectly (no clock sampling rate error), the Doppler compressed PRS sequence period will be too short as shown in FIG. 7. Conversely, if a satellite is moving away from an SPS receiver, the Doppler shift is negative (the apparent time scale for the received PRN sequences is too slow). The received PRN sequences will again not have their nominal length in such a scenario but instead will be expanded in time as also shown in FIG. 7.

For example, suppose the expansion or compression is the same as the clock offset example: 2.5% of a chip period. That means that even if first sample 701 is centered perfectly in the first chip, the final sample 705 will be displaced by 2.5% of the chip period from where it should have been sampled (if Doppler shift were accounted for). The same failure in coherent integration as discussed above with regard to the clock sampling rate error will level off the coherent integration game by just twenty PRN sequences. A navigation data symbol boundary may not even have been crossed by the $20^{th}$ PRN sequence yet there is no benefit from further coherent integrations. The effects of receiver-clock sampling rate error and Doppler shift make the perfect replica PRN sequence desynchronized with the samples of the received PRN sequences. For this reason, conventional coherent integration techniques have always been unsatisfactory and do not boost performance in weak-signal environments.

Example Embodiments

The deleterious effects of sampling-rate error and Doppler on the sampling of the received PRN sequences in an SPS receiver are avoided by a constructive resampling. The resampling is "constructive" because one cannot go back in time and actually sample the received PRN sequences at the proper sampling rate. But because of clock offset and the Doppler shift, the received PRN sequences will typically be sampled at too fast of a rate or too slow. If the received PRN sequences could have been sampled at the proper clock rate—one that has no clock offset and is also increased or decreased to account for Doppler-shift-induced expansion or compression of the apparent time scale for the received PRN sequences—then the samples of the received PRN sequences and corresponding samples of the perfect reference PRN sequences are synchronous. Given such a re-alignment of the re-sampled received PRN sequences with the samples of the perfect reference sequences, a sufficient series of received PRN sequences may then be cross-correlated with the appropriate perfect replica PRN sequences and coherently added to solve the weak-signal dilemma for the satellite-based positioned system arts. This re-sampling may alternatively be performed on the perfect reference samples.

The alignment of the received PRN sequences and the perfect references can be performed in the time domain or in the frequency domain. A time-domain embodiment will be discussed first.

Time Domain Re-Sampling

As discussed above, a received PRN sequence can be compressed or expanded in time depending upon its Doppler shift. Such a compression or expansion is with reference to a "true" time for the received PRN sequences in the absence of a Doppler shift. Such misalignment of the received PRN sequences with the true time scale is independent of the SPS receiver clock rate. But as also discussed above, the SPS receiver clock rate itself may be too fast or too slow with reference to such a true time scale. On the other hand, the perfect reference PRN sequence replicas are generated according to the true time scale. The perfect reference PRN sequence replicas can be cross-correlated with the corresponding received PRN sequences in either the time domain or the frequency domain. Analogous cross-correlation in the time or frequency domains is well known with regard to the conventional cross-correlation of a single received PRN sequence with a replica PRN sequence.

But regardless of whether the cross-correlation is performed in the time or frequency domain, the perfect reference PRN sequence replicas are generated as time samples corresponding to the time samples of the received PRN sequences. Since an SPS receiver in a weak-signal environment has not yet acquired a position fix, its clock offset is unknown. In generating a perfect reference PRN sequence replica in such a case, the SPS receiver thus has no information on how fast or slow its clock is ticking. It can only assume that the clock is sampling according to a nominal or intended sampling rate. The perfect reference PRN sequence replicas are thus generated according to this intended sampling rate and "true" time scale. But such an intended sampling rate will fail because it does not account for the Doppler shift or the SPS receiver clock offset.

To account for the Doppler shift and the SPS receiver clock offset, the effective sampling rate for the time samples of the received PRN sequences is adjusted to form re-sampled time samples of the received PRN sequences. For example, suppose that a series of fifty received PRN sequences are going to be cross-correlated and the cross-correlation results coherently added. If the intended sampling rate was one sample per chip and the PRN sequence length is 1023 chips, the fifty received PRN sequences would be represented by 50*1023=531,960 samples (each sample being a complex number having an I and Q component). But if sampling rate were too high, the sampling rate offset will quickly mean that a given sample is not of the intended chip for a given received PRN sequence. For example, if the sampling rate is too high, a sample that was believed to be of the ith chip in the later ones of the received PRN sequences is actually of an (ith−1) chip or an (ith−2) chip, and so on. The corresponding perfect replica PRN sequence sample is then of the wrong chip, which destroys the resulting cross-correlation result.

Conversely, if the sampling rate were too slow, the reverse problem occurs. The sampling range will then extend beyond the intended fifty PRN sequences. Moreover, the sampling rate offset will mean that, as the sampling sufficiently proceeds across the received PRN sequences, an intended sample of an ith chip is actually of an (ith+1) chip or an (ith+2) chip, and so on.

Figure 8:
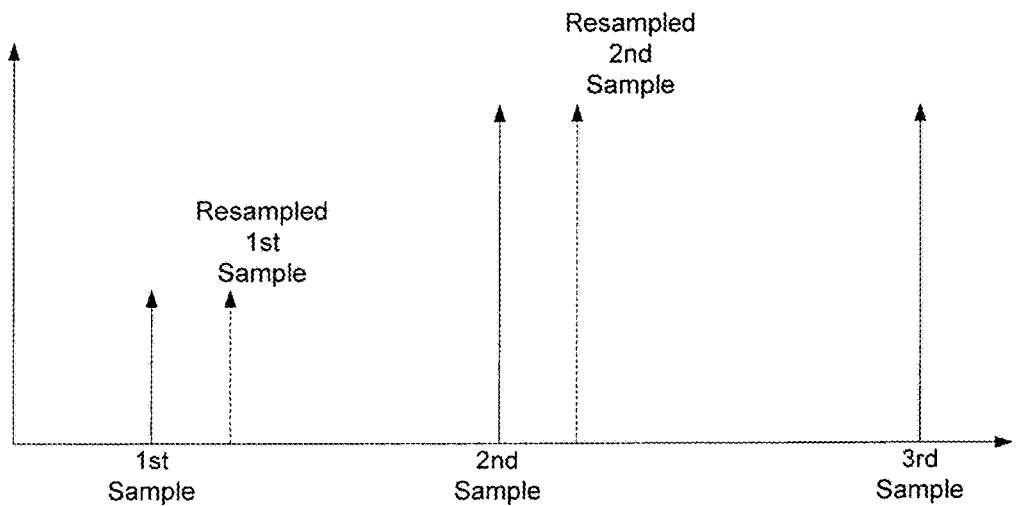
FIG. 8 illustrates an example re-sampling for a series of original time samples.

It is of course unknown prior to acquisition whether the sampling rate should be increased or decreased. Thus a sampling frequency range can be tested at various points. For example, in one embodiment, the sampling frequency search range about the nominal sampling frequency is 5 Hz, tested in $\frac{1}{10}$ of a Hz increments. For example, in a GPS system, a nominal sampling rate might be eight samples per chip, which would be an 8 MHz nominal sampling rate. This nominal sampling rate would be effectively varied according to the effective sampling rates tested within the sampling rate search range. The original samples are interpolated to produce a set of re-sampled time samples. Each re-sampling corresponds to an effective sampling rate in that the sampling rate is constructively altered from that used to actually obtain the original samples. The original samples are taken at some nominal sampling rate (albeit with an unknown clock offset). For example, the nominal sampling rate may be 8 samples per chip. Each sample was thus intended to be separated in time by $\frac{1}{8}^{th}$ of a chip period. Given such a nominal sampling rate, an interpolation may be performed to re-sample for points at a slightly lower clock rate. For example, suppose one has a first sample, an adjacent second sample, and a subsequent third sample as shown in FIG. 8.

If one wants to slightly slow the effective sampling clock, the re-sampled first time sample to replace the original first sample may equal a linear interpolation of the first and second original samples. This would be a weighted value of the first and second samples based upon the desired effective sampling rate offset. Since the offset is such that the re-sampled values are just slightly slower than the original values, such an interpolation would more heavily weight the first value as opposed to the second value as shown. Other types of interpolation may be used. An analogous interpolation would be used to replace the original second sample with a re-sampled second sample, and so on to complete the re-sampling. If one instead wants to re-sample with a faster effective sampling rate, some of the beginning or ending samples are discarded and the remaining samples re-sampled accordingly.

Each tested effective sampling rate across a search range is then used to produce a corresponding re-sampling of the series of received PRN sequences. Each resulting re-sampled series of received PRN sequences is cross-correlated with corresponding samples of the perfect reference PRN replica sequences and coherently summed. The tested effective sampling rate that provides the maximum value for a cross-correlation is used to acquire the received PRN sequences (determine their time of arrival). Given this acquisition, a pseudorange can then be obtained as is conventional in the SPS arts. But what is not conventional is the resampling that enabled this coherent addition by appropriately aligning the perfect reference PRN sequences with the received PRN sequences.

Figure 4:
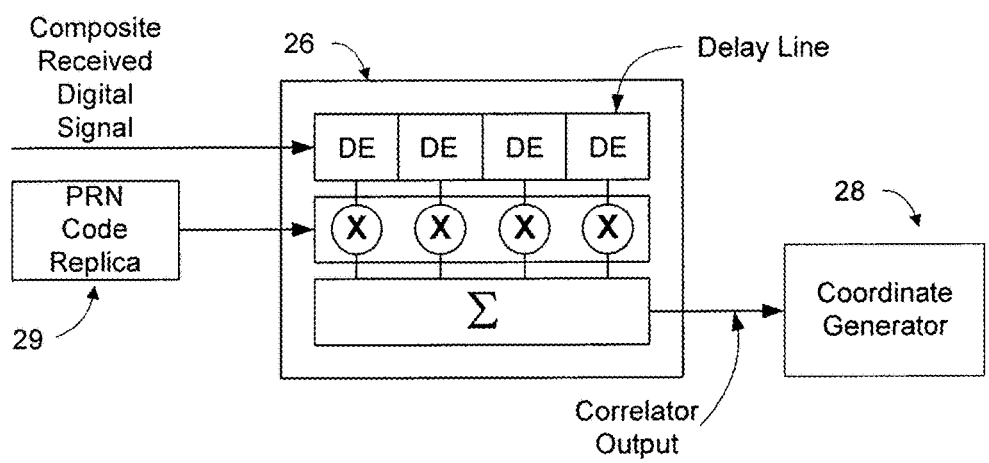
FIG. 4 describes a prior art correlator block diagram.
Figure 5:
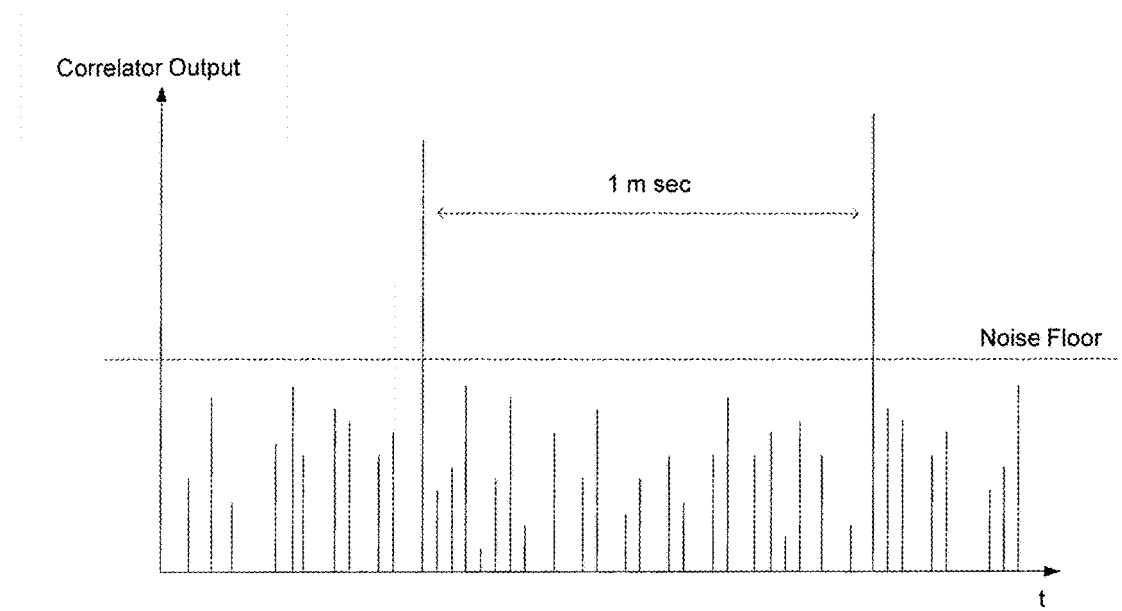
FIG. 5 is a plot of the correlator output of a prior art GPS receiver in a strong-signal environment.
Figure 6:
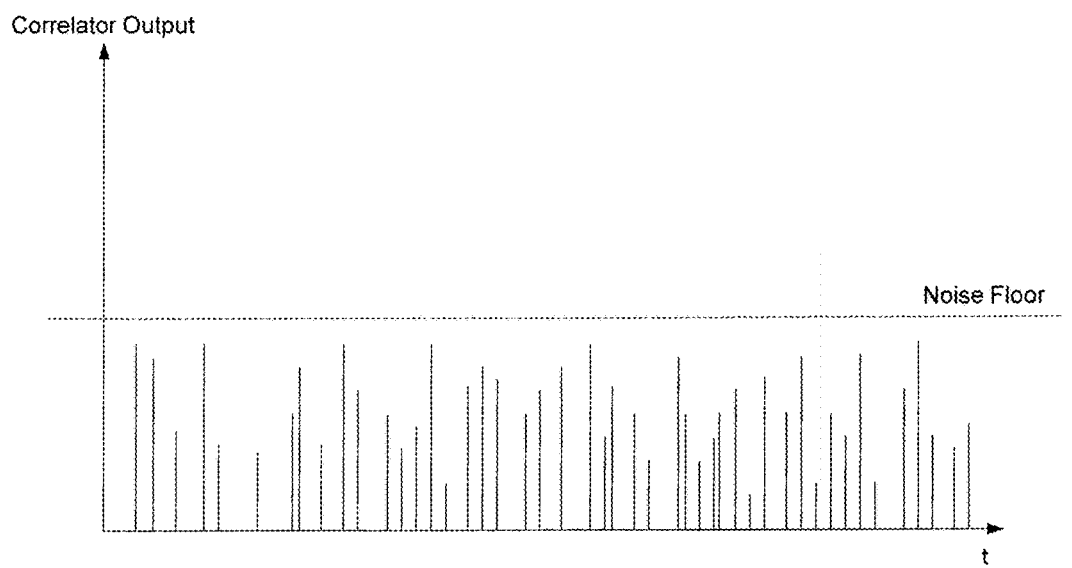
FIG. 6 is a plot of the correlator output of a prior art GPS receiver I a weak-signal environment.
Figure 9:
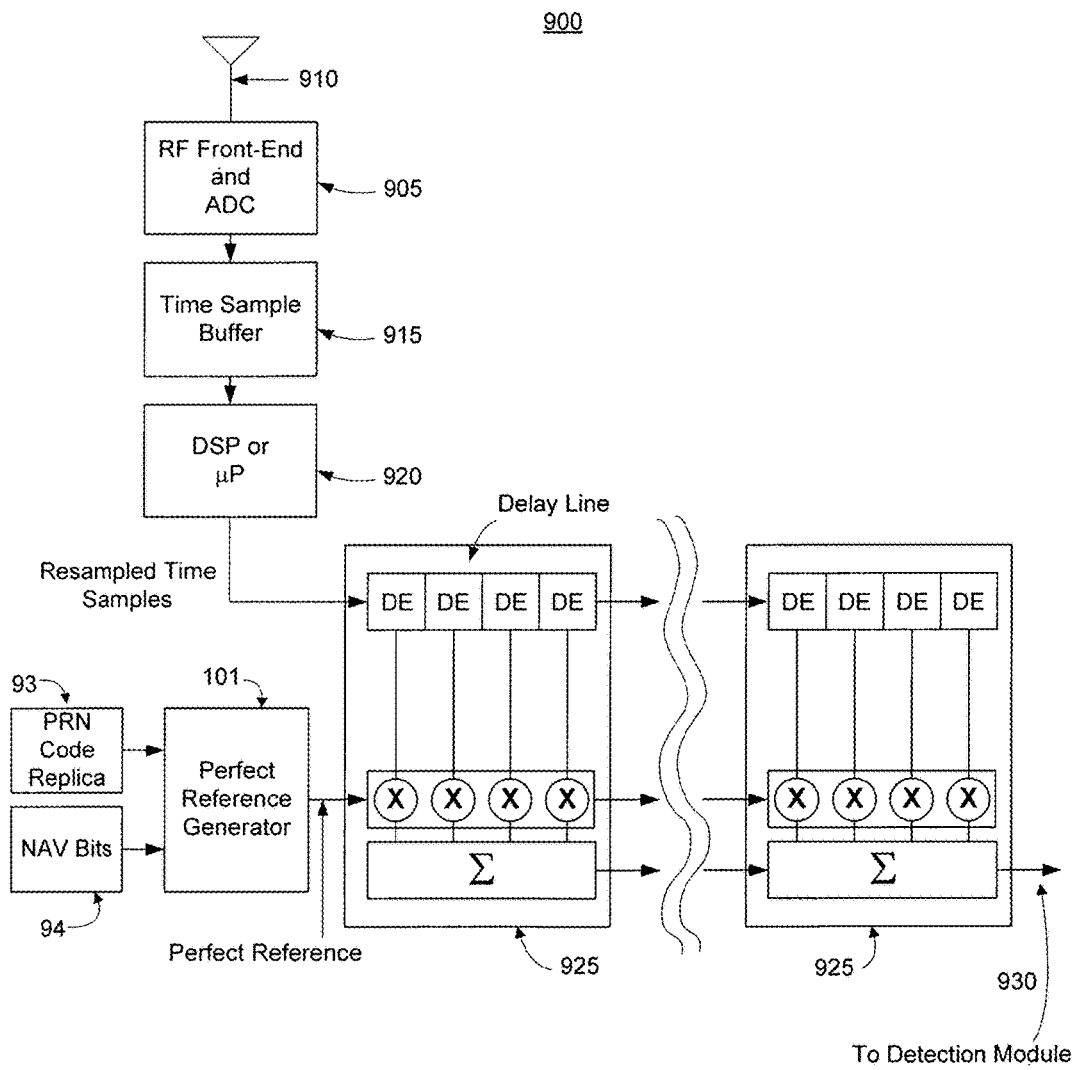
FIG. 9 is a block diagram of an SPS receiver configured to re-sample in accordance with a first embodiment.
Figure 10:
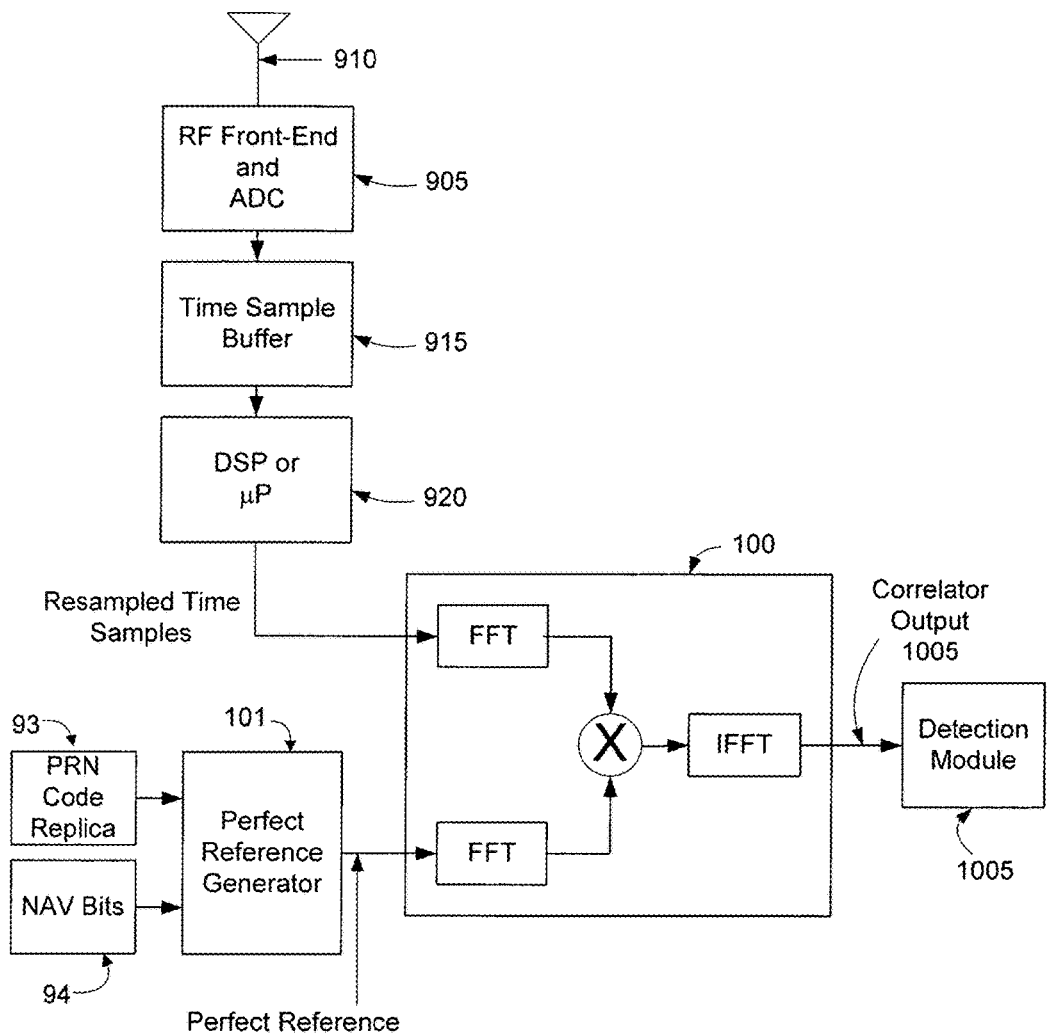
FIG. 10 is a block diagram of an SPS receiver configured to re-sample in accordance with a second embodiment.

FIG. 9 illustrates an example SPS receiver 900. An RF front end and analog-to-digital converter (ADC) 905 receives the transmitted PRN sequences on an antenna 910 and digitizes the received PRN sequences to form time samples of the received PRN sequences. The resulting original time samples are stored in a sample buffer 915. A microprocessor or DSP 920 may then re-sample the original time samples at each of the desired test points or values across a search range for an effective sampling rate. The re-sampled time samples for a given tested effective sampling rate may then be correlated in correlators 925. Correlators 925 are shown separately to comport with the description of correlator 26 of FIG. 4. In other words, each correlator 925 includes the delay line for a corresponding one of the PRN sequences. If the series of received PRN sequences (as represented by re-sampled time samples) is to be cross-correlated with corresponding samples of the perfect reference PRN replica sequences and then coherently summed, there would be fifty correlators 925. A perfect reference generator 101 receives the navigation bits 94 and the appropriate PRN replica 93 (for one PRN sequences) and produces samples of the corresponding perfect reference PRN sequence replicas for the sampled received PRN sequences. A coherent sum 930 for each effective sampling rate may then be compared to the other coherent sums 930 for the remaining effective sampling rates in a detection module (not illustrated but discussed below with regard to FIG. 10) to find the maximum value and determine the arrival times of the received PRN sequences accordingly. Although such a time-domain cross-correlation is theoretically possible, it is much more convenient to perform the cross-correlation in the frequency domain as shown in FIG. 10 for a SPS receiver 1000.

SPS receiver 1000 is analogous to SPS receiver 900 except that time-domain correlators 926 are replaced by a frequency domain correlator 100. In frequency domain correlator 100, the resampled time samples for the received PRN sequences and the samples for the perfect reference PRN replica sequences are each converted into the frequency domain by, for example, FFT operations. The resulting FFTs may then be multiplied before being converted into a resulting coherent sum 1005 of all the cross-correlations using an inverse FFT operation. In other words, all the cross-correlations for each received PRN sequence with its perfect reference are accomplished by merely multiplying their corresponding FFTs and then performing an IFFT. For this reason, cross-correlation is typically performed in the frequency domain in conventional SPS receivers. A detection module 1010 detects the maximum cross-correlation value and determines the arrival time for the received PRN sequences accordingly.

It will be appreciated that the re-sampling discussed above could instead be practiced on the samples of the perfect reference PRN replica sequences. For example, with regard to receiver 1000, the resampling operation performed by DSP/microprocessor 920 may instead be performed on the perfect reference samples from generator 101. The FFT for the perfect reference would then be an FFT of the re-sampled perfect reference. The samples of the received PRN sequences would then be processed by frequency-domain correlator 100 without any re-sampling. However, the samples of the perfect reference would be re-sampled. Since either the samples of the received PRN sequences or the perfect reference samples can be chosen for re-sampling, the samples that are not re-sampled may be referred to as not-re-sampled samples. In both cases, re-sampled samples are cross-correlated with not-re-sampled samples. If the received PRN sequences are re-sampled, the not-re-sampled samples are the perfect reference samples. Conversely, if the perfect reference samples are re-samples, the samples of the received PRN sequences would be the not-re-sampled samples.

Frequency Domain Re-Sampling

As yet another alternative, the effective resampling of the received PRN sequences may be performed in the frequency domain through an appropriate filtering operation. As discussed with regard to the time-domain resampling, the re-sampling filtering may be performed on either the FFT of the samples for the received PRN sequences or on the FFT of the perfect reference. For example, in SPS receiver 1000, the time-domain re-sampling by DSP/microprocessor 920 would be omitted. Instead, a re-sampling filter would be inserted between the FFT operation and the subsequent multiplication for either the received PRN sample path of the perfect reference path.

Geometric Facts

A solution for determining the location of commonly located devices will now be discussed that advantageously exploits the technique disclosed herein for weak-signal environment signal acquisition. This includes stationary or slow moving GPS receivers as well as devices that are subscribers to a hybrid location system. It will be appreciated that the hybrid solution disclosed herein is also applicable to conventional formation of pseudoranges (albeit with the use of perfect references). It will be appreciated that a pseudorange includes the ranging and ephemeris information of the acquired satellite. The perfect reference provides an ability to determine the transmit time of the received signal by each satellite. By comparing the specific bits used in the perfect reference signal to the navigation message transmitted by that satellite, the exact transmit time of the bit sequence used in the perfect reference as well as the location of the satellite when the signal was transmitted can be determined. Increasing the number of NAV bits that are used in the perfect reference signal reduces the ambiguity when compared to the NAV bits stream transmitted by the satellite. Knowing the approximate time the signal was received by the GPS receiver and/or the approximate location of the GPS receiver greatly reduces ambiguity error, but may not be required.

As used herein, a "geometric fact" refers to the navigational equations resulting from the acquisition of two or more satellite signals. A "geometric fact" may also be denoted herein as an "observation set" with regard to the corresponding navigational equations. Regardless of the nomenclature, the following hybrid solution enables the advantageous combination of a pseudorange (or a 2D position fixes, or even a 3D position fix) with other non-concurrent satellite signal acquisitions. This is quite advantageous in that the preceding discussion enables an SPS receiver to coherently integrate the cross-correlation results for a series of received PRN sequences. For the first time, a SPS receiver can then acquire satellites in weak-signal environments such as indoor environments or urban canyons. But even with the powerful signal processing techniques disclosed herein, it may be the case that less than 4 satellites can be acquired.

Recall that a 3D position fix requires four satellite acquisitions (four pseudoranges). This is easy to see: each pseudorange is associated with four unknowns: the three dimensional unknowns for an SPS receiver's 3D position as well as the unknown clock offset. Since it takes four equations to solve for four unknowns, a 3D position fix requires four pseudoranges. If, as also discussed earlier, one assumes that the Z (height) parameter is some known elevation (e.g., sea level), then a position fix is 2D as only the X and Y parameters are unknown. In such a case, three pseudoranges are sufficient for a position fix.

But it may be the case that only a single pseudorange is obtained, even with the powerful signal processing techniques disclosed herein. Suppose that one is a weak signal environment at some known location (for example, a landmark such as a storefront, etc.). The SPS receiver is at a known location but one does not have its 3D coordinates. At some other time, another SPS receiver collects another pseudorange at this same location. Alternatively, the same SPS receiver collects another pseudorange at this location but sufficiently displaced in time so that the clock offset can be assumed to have changed. One might suppose that these single non-concurrent pseudoranges could be combined in some fashion since we know they are all taken at the same location. But it analogous to a dog chasing its tail: we start out with four unknowns. Each additional pseudorange adds another unknown. So there can be no solution of all these unknowns without further information. But suppose we have pairs of pseudoranges, each pair taken at different times at this same location. The unknown clock offset for the first pair may be denoted as φ1, the unknown clock offset for a second pair denoted as φ2, and the unknown clock offset for a third pair denoted as φ3. The first pair of the pseudoranges provides two equations for the 3D location plus φ1. The second pair of the pseudoranges provides two equations for the 3D location plus φ2. Finally, the third pair of the pseudoranges provides two equations for the 3D location plus φ3.

But notice what has happened: there are then 6 equations and 6 unknowns (the 3D location, φ1, φ2, and φ3) from these three pairs of non-concurrent pseudoranges. The location can then be solved despite never having a traditional acquisition of four concurrent pseudoranges. This is quite advantageous in that the powerful signal processing techniques disclosed herein make it very likely that an SPS receiver may acquire two concurrent pseudoranges despite being in a weak-signal environment.

One need not have 3 pairs of pseudoranges: for example, a pair of pseudoranges taken at a common location with 3 pseudoranges taken all taken simultaneously at some other time at this common location will also provide sufficient information for a 3D position fix. Moreover, just two pairs of non-concurrent pseudoranges are sufficient for a 2D position fix.

Just like other hybrid location services, an SPS receiver may be associated with a hybrid database or server. An SPS receiver such as a handset will typically have WiFi or other sorts of wireless receivers. The SPS receiver can then determine that it is seeing a first received signal strength from a first WiFi access point (AP), a second received signal strength from a second AP and so on. Such measurements may act as a proxy for the knowledge of "being in the same location" such as done through being located at a landmark as discussed above. If a handset (or other type of SPS-enabled receiver) cannot acquire a sufficient number of satellites for a position fix, the handset will likely, however be able to acquire a pair of pseudoranges using the powerful signal processing techniques disclosed herein. The handset could thus be programmed to monitor these wireless proxies for location such as received signal strengths for Aps and report the proxies and the observed pseudoranges to the hybrid database or server.

The server could then search its database to find other reported pseudoranges that were taken when reporting the same wireless proxies for location. A position fix for the SPS receiver could then be calculated using these non-concurrent pairs (or triplets) of pseudoranges as discussed above. These remarkably advantageous hybrid location principles and concepts are better understood with reference to the following examples.

The ability to determine the transmit time and satellite location allows for the derivation of observation sets, which consists of navigational equations of two or more acquired satellites (or alternatively represented by a geometric fact). The following equation represents the jth observation set:

$$P_j^k = [(X^k - X)^2 + (Y^k - Y)^2 + (Z^k - Z)^2]^{0.5} + c(dt_j - dt^k) + T_j^k + I_j^k + e_j^k$$

$X^k, Y^k, Z^k$ = location coordinates of acquired satellite k (Note 1)
X, Y, Z = location coordinates of receiver (Note 2)
c = speed of light (Note 3)
$dt_j$ = receiver clock offset for j-th observation set (Note 2)
$dt^k$ = clock offset of satellite k (Note 1)
$T_j^k$ = tropospheric offset (Note 4)
$I_j^k$ = isotropic offset (Note 1)
$e_j^k$ = measurement error (Note 5)
Where:
  Note 1 Known from navigation message
  Note 2 Unknown
  Note 3 Known
  Note 4 Determined by Model
  Note 5 Minimized unknown error
for k in $K_j$, the set of satellites acquired in observation j. For each observation set j we have one unknown $dt_j$.

Altogether we have $$\sum_{j \in J} |K_j|$$

equations and 3+|J| unknowns, where |Kj| is the number of acquired satellites in the j-th observation set and |J| is the number of observation sets. Therefore, for each observation set with two or more satellites, there are three receiver location unknowns X, Y, and Z and one receiver clock offset $dt_j$. If we have three observation sets with two satellites each, there are six navigational equations and six unknowns, including three common receiver location unknowns and three receiver clock offsets. Using the navigational equations, X, Y and Z can be determined, representing the three-dimensional coordinates of the receiver. Similarly, if there are two observation sets with two satellites each, there are five unknowns, including three common receiver location unknowns and two receiver clock offsets. Setting Z to sea level, we have four equations and four unknowns. The navigational equations can be solved for X and Y representing the two-dimensional coordinates for the receiver. If the observation sets do not converge to a single point, a number of well-understood methods such as least squares fit may be employed.

The following is a non-limiting example of three observation sets obtained, each observation set consisting of two acquired satellites (and the resulting navigational equation for each acquired satellite). The six navigational equations are used to determine the three-dimensional coordinates of the receiver. Three observation sets each with two acquired satellites yields six equations and six unknowns, including three common receiver location unknowns and three receiver clock offsets. A navigation equation can solve for X, Y and Z representing the three-dimensional receiver coordinates.

Observation set 1 received at time T_1 by receiver R, containing acquired satellite A and satellite B $$P_R^A = [(X^A-X)^2+(Y^A-Y)^2+(Z^A-Z)^2]^{0.5}+c(dt_R-dt^A)+T_R^A+I_R^A+e_R^A \quad \text{Equation 1}$$

Where: $X^A$, $Y^A$, $Z^A$=location coordinates of acquired satellite A
X, Y, Z=location coordinates of receiver R
c=speed of light
$dt_R$=receiver R clock offset at time T_1
$dt^A$=clock offset of satellite A at time T_1
$T_R^A$=tropospheric offset
$I_R^A$=ionospheric offset
$e_R^A$=measurement error $$P_R^B = [(X^B-X)^2+(Y^B-Y)^2+(Z^B-Z)^2]^{0.5}+c(dt_R-dt^B)+T_R^B+I_R^B+e_R^B \quad \text{Equation 2}$$

Where:
$X^B$, $Y^B$, $Z^B$=location coordinates of acquired satellite B
X, Y, Z=location coordinates of receiver R
c=speed of light
$dt_R$=receiver R clock offset at time T_1
$dt^B$=clock offset of satellite B at time T_1
$T_R^B$=tropospheric offset
$I_R^B$=ionospheric offset
$e_R^B$=measurement error Observation set 2 received at time T_2 by receiver R, containing acquired satellite C and satellite D $$P_R^C = [(X^C-X)^2+(Y^C-Y)^2+(Z^C-Z)^2]^{0.5}+c(dt_R-dt^C)+T_R^C+I_R^C+e_R^C \quad \text{Equation 3}$$

Where:
$X^C$, $Y^C$, $Z^C$=location coordinates of acquired satellite C
X, Y, Z=location coordinates of receiver R
c=speed of light
$dt_R$=sensor R clock offset at time T_2
$dt^C$=clock offset of satellite C at time T_2
$T_R^C$=tropospheric offset
$I_R^C$=ionospheric offset
$e_R^C$=measurement error $$P_R^D = [(X^D-X)^2+(Y^D-Y)^2+(Z^D-Z)^2]^{0.5}+c(dt_R-dt^D)+T_R^D+I_R^D+e_R^D \quad \text{Equation 4}$$

Where:
$X^D$, $Y^D$, $Z^D$=location coordinates of acquired satellite D
X, Y, Z=location coordinates of receiver R
c=speed of light
$dt_R$=receiver R clock offset at time T_2
$dt^D$=clock offset of satellite D at time T_2
$T_R^D$=tropospheric offset
$I_R^D$=ionospheric offset
$e_R^D$=measurement error Observation set 3 received at time T_3 by Receiver R, containing acquired satellite E and satellite F $$P_R^E = [(X^E-X)^2+(Y^E-Y)^2+(Z^E-Z)^2]^{0.5}+c(dt_R-dt^E)+T_R^E+I_R^E+e_R^E \quad \text{Equation 5}$$

Where:
$X^E$, $Y^E$, $Z^E$=location coordinates of acquired satellite E
X, Y, Z=location coordinates of receiver R
c=speed of light
$dt_R$=receiver R clock offset at time T_3
$dt^E$=clock offset of satellite E at time T_3
$T_R^E$=tropospheric offset
$I_R^E$=ionospheric offset
$e_R^E$=measurement error $$P_R^F = [(X^F-X)^2+(Y^F-Y)^2+(Z^F-Z)^2]^{0.5}+c(dt_R-dt^F)+T_R^F+I_R^F+e_R^F \quad \text{Equation 6}$$

Where:
$X^F$, $Y^F$, $Z^F$=location coordinates of acquired satellite F
X, Y, Z=location coordinates of receiver R
c=speed of light
$dt_R$=receiver R clock offset at time T_3
$dt^F$=clock offset of satellite F at time T_3
$T_R^F$=tropospheric offset
$I_R^F$=ionospheric offset
$e_R^F$=measurement error Two observation sets containing two acquired satellites are required to derive a two-dimensional location coordinate. A minimum of 1) three observation sets each containing two acquired satellites or, 2) one observation set containing two acquired satellites plus one observation set containing three acquired satellites are required are required to derive a three-dimensional location coordinate. There is no limitation to the number of observation sets and number of acquired satellites per observation set that can be used together in order to solve for the location coordinates X, Y, and Z, as it would result an over-determined system of equations. As additional observation sets are obtained, the location coordinates may be re-calculated. Furthermore, observation sets may be selectively added or removed from the calculation based on a number of factors, including but not limited to age, code phase, and/or detected movement of the receiver. This is primarily done to improve the accuracy of the derived location coordinates. Further, observation sets used in a navigational equation may be derived from signals received at various times. In fact, observation sets have no time expiration. For stationary and slow moving receivers, time-diverse observation sets reduce the impact of low frequency fading, especially prevalent at indoor locations, improving both acquisition probability and location accuracy. For slow moving receivers, the time diversity may span seconds; for completely stationary receivers there is no time limit to the time diversity of observation sets that are used to derive location coordinates.

Furthermore, an increasingly number of GPS receivers are capable of receiving signals from multiple GNS systems, an observation set and associated navigational equations derived from one GNSS may be used in combination with observation sets and associated navigational equations from a different GNS systems in order to derive the location coordinates of a receiver. For example, navigational equations from observation sets obtained from the NAVSTAR GNSS may be used together with navigational equations from observation sets obtained from the Galileo GNSS in order to derive the location coordinates of a receiver.

Figure 11:
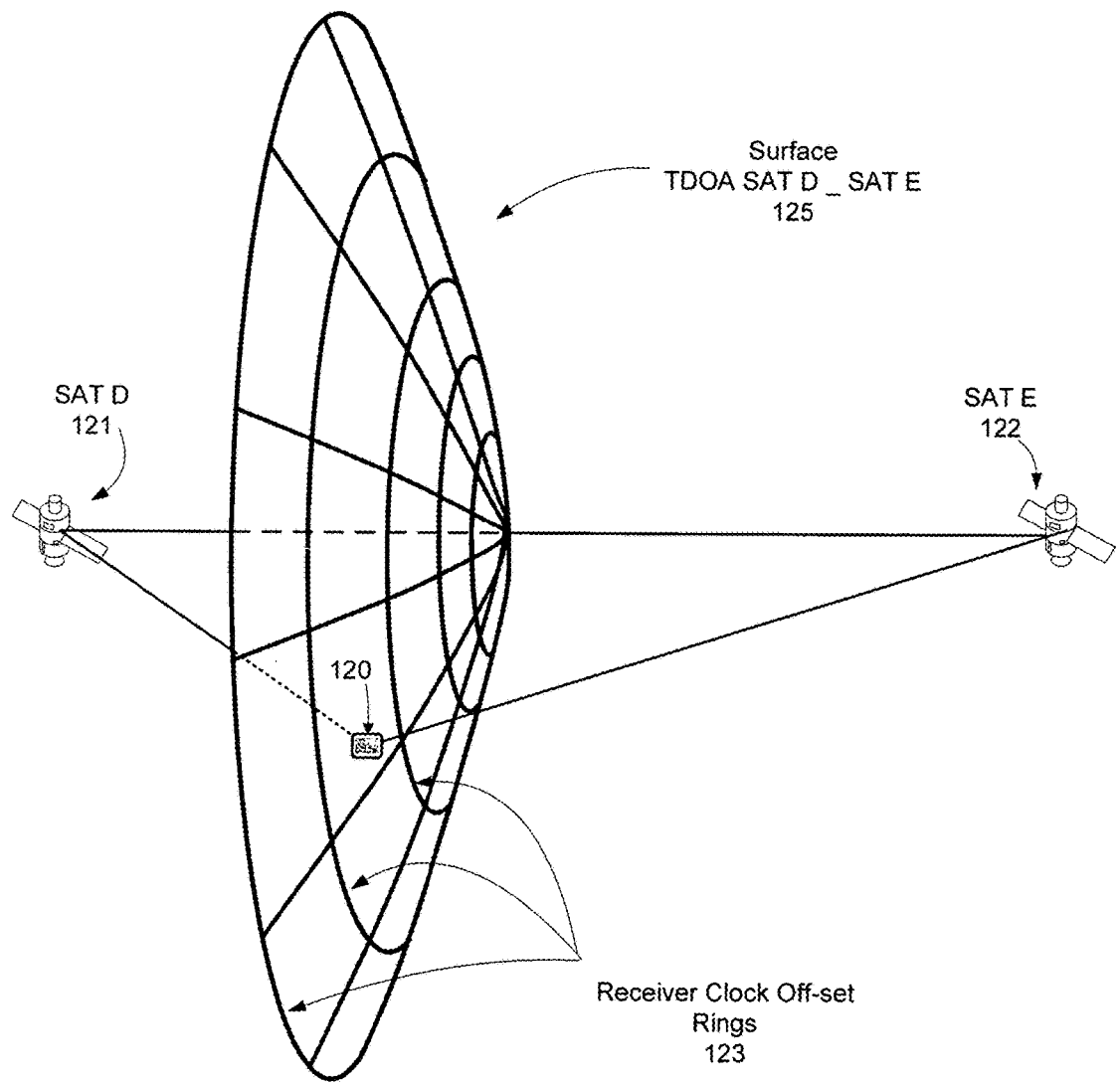
FIG. 11 describes the derivation of a geometric fact according to an embodiment.

As mentioned above, each observation set may be represented as a geometric fact. FIG. 11 illustrates a geometric fact referred to as a surface as enabled by the present invention. A surface is a geometric fact that corresponds to an observation set consisting of two acquired satellites. Pseudorange information has been determined from the two acquired satellites SAT D 121 and SAT E 122. As the receiver clock offset $dt_j$ is common to the derivation of both pseudoranges, surface 125 is defined by the 1) locations of SAT D 121 and SAT E 122 and 2) the time difference of arrival (TDOA) of the two pseudoranges. Surface 125 satisfies all values for receiver clock offset $dt_j$, as illustrates by receiver clock offset rings 123. Receiver 120 is located on surface 125. As mentioned above, observation sets and resulting navigational equations and geometric facts once defined, have no time expiration.

Figure 12:
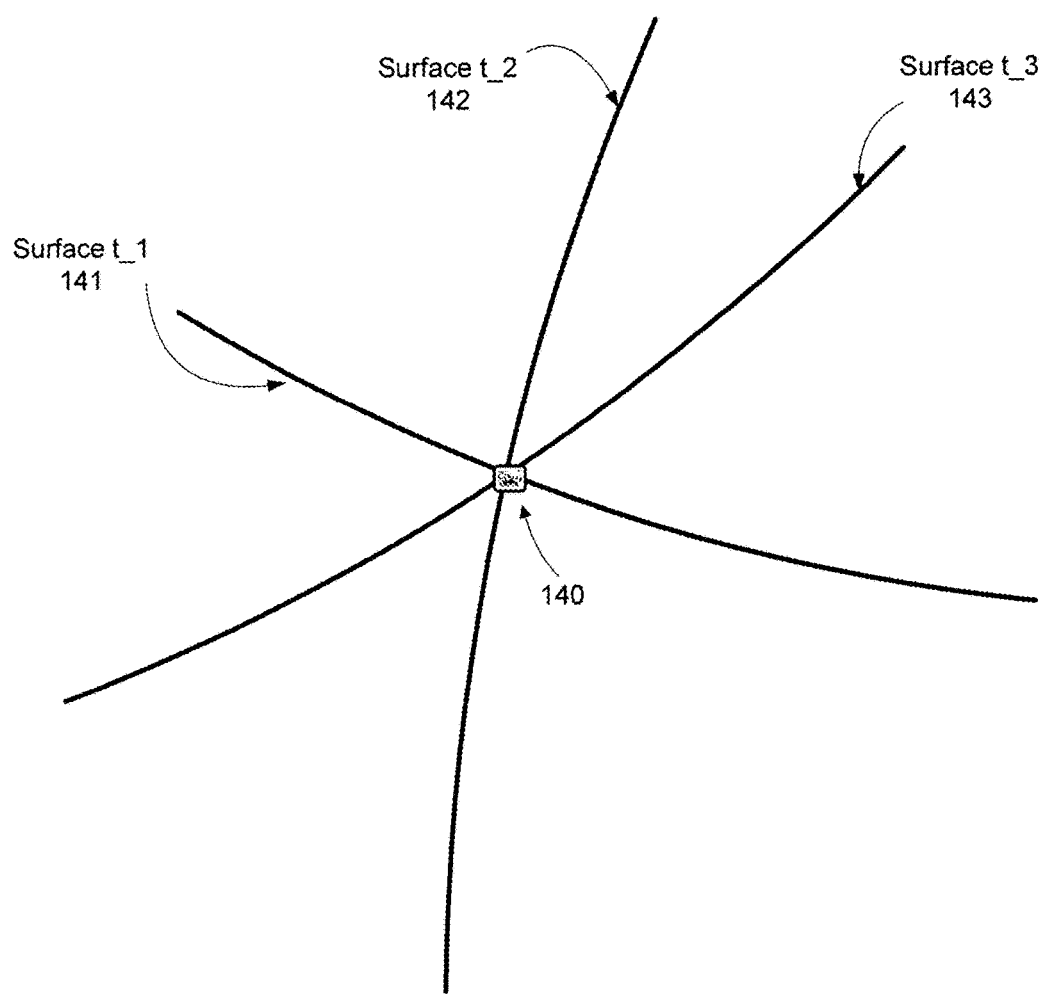
FIG. 12 describes determining the location coordinates of a client device using geometric facts according to an embodiment.

FIG. 12 illustrates a non-limiting example of how the location coordinates of a receiver are derived using surface geometric facts. At times t_1, t_2, and t_3, geometric facts, surface t_1 141, surface t_2 142, and surface t_3 143 respectively, were derived from GPS signals received by receiver 140. The intersection of the three surfaces is determined using a geometric equation and represents the location coordinates of receiver 140, as it is located on all three surfaces. If the three geometric facts do not converge to a single point, a number of well-understood methods such as least squares fit may be employed. There is no limitation to the number of geometric facts that can be used within a single geometric equation. As additional geometric facts are obtained, the location coordinates for client device 140 may be re-calculated. Furthermore, geometric facts may be selectively added or removed based on a number of factors, including but not limited to age, code phase, and/or detected movement of client device 140. This is primarily done to improve the accuracy of the derived location coordinates.

Furthermore, an increasingly number of GPS receivers are capable of receiving signals from multiple GNS systems, geometric facts derived from one GNSS may be used in combination with geometric facts derived from a different GNSS in order to derive the location coordinates of a GPS receiver by using a geometric equation. For example, geometric facts obtained from the NAVSTAR GNSS may be used together with geometric facts obtained from the Galileo GNSS in order to derive the location coordinates of a receiver.

To further improve the reliability and accuracy of determining location coordinates, the present invention allows for the use of non-GPS ranging information together with observation sets and either the resulting navigational equations or geometric facts. This includes but not limited to ranging information from Wi-Fi devices, Bluetooth devices, Zigbee devices, broadcast transmitters, and cellular transmitters. Furthermore, ranging metrics may include received signal strength indication (RSSI) and/or time of arrival (TOA).

Figure 13A:
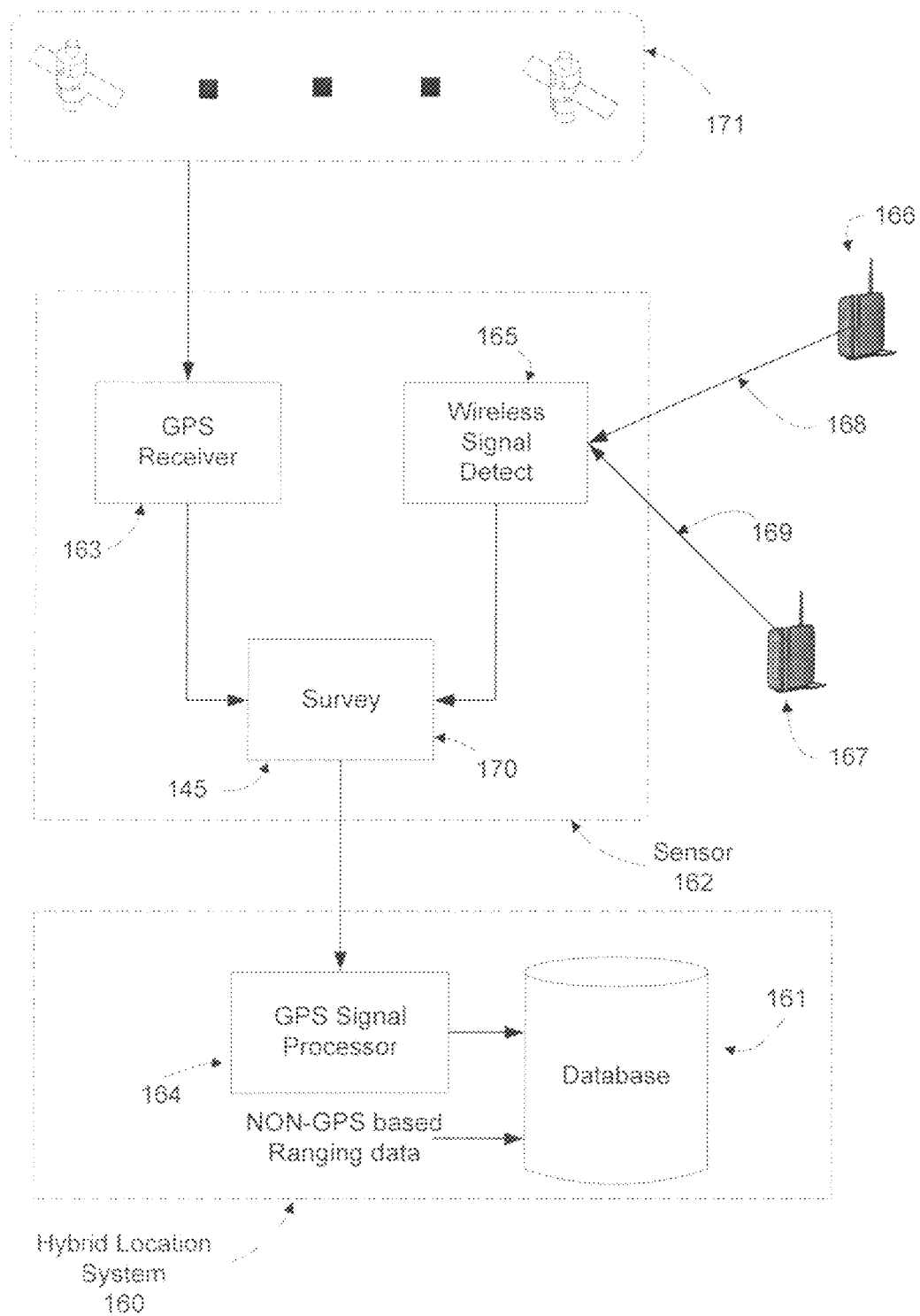
FIGS. 13a and 13b describe a hybrid location system according to an embodiment.
Figure 13B:
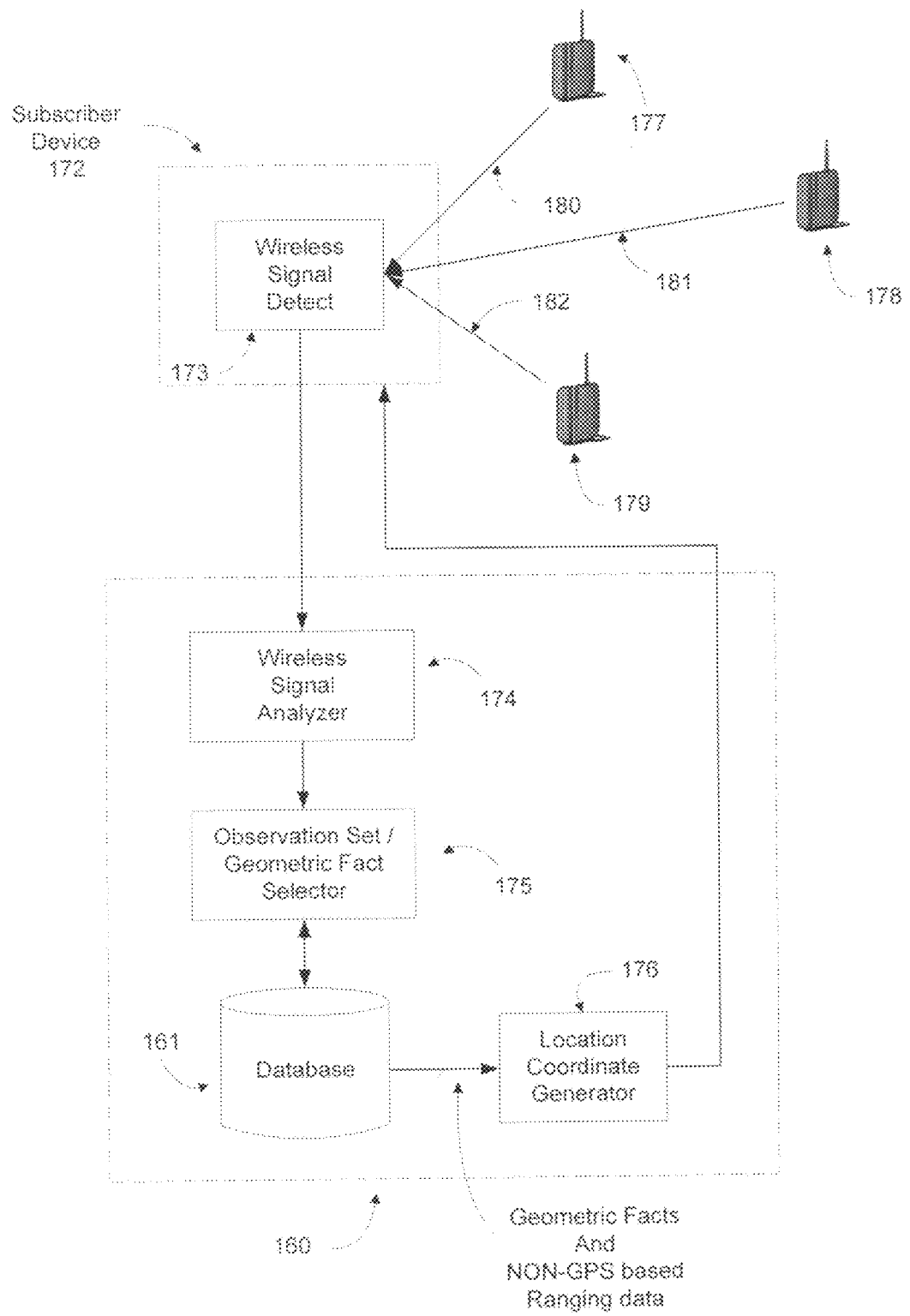
Figure 14:
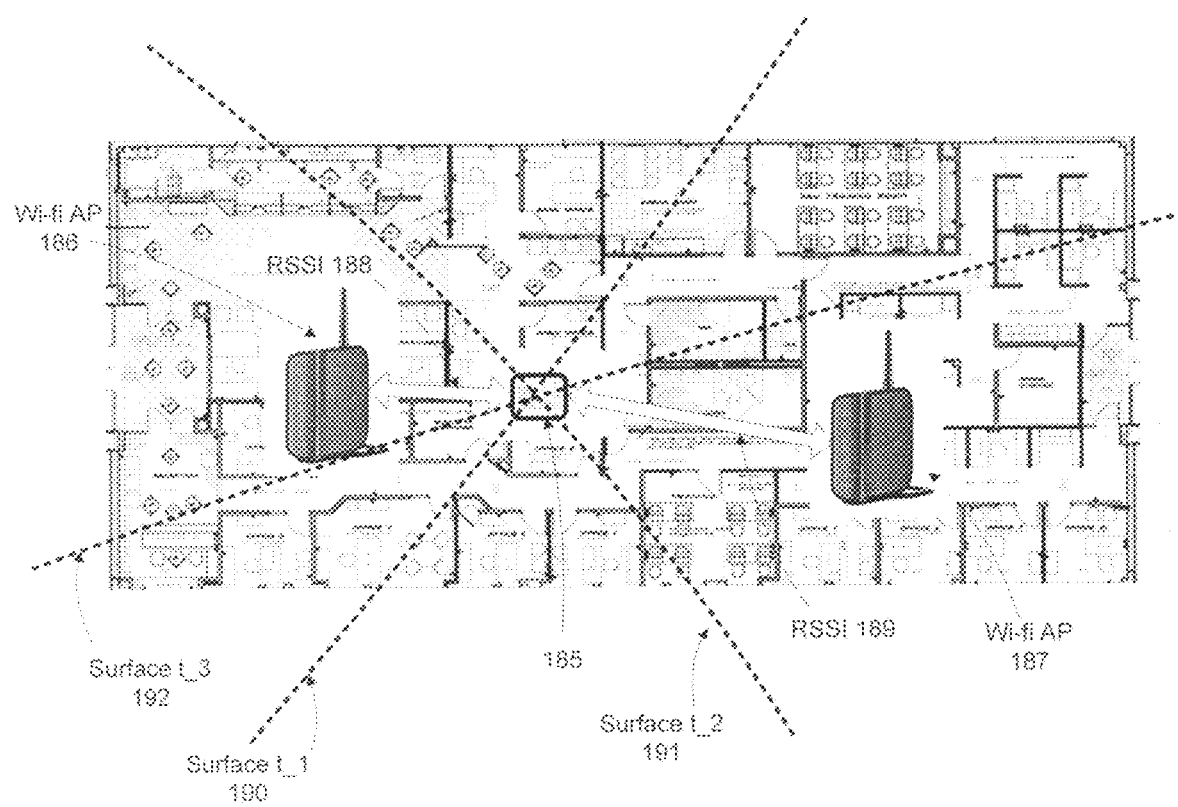
FIG. 14 describes a hybrid location system according to an embodiment.

As mentioned above, the present invention may also be employed to enhance the performance of determining the location of subscriber devices of a hybrid location system. FIG. 13a, FIG. 13b, and FIG. 14 illustrate a non-limiting example of the present invention where sensors are employed to provide surveys to a hybrid location system, which utilizes observation sets (or geometric facts) to locate objects and wireless signatures (proxies for location) in order to provide location coordinates of subscriber devices.

FIG. 13a describes how sensors are employed to provide survey data to a hybrid location system of the present invention. Sensor 162 includes a GPS receiver 163, capable of receiving the composite signal from GPS satellite constellation 171 and providing a GPS composite digital signal. Wireless signal detection 165 is capable of detecting wireless signal characteristics, in this example, from Wi-Fi access points. Examples of signal characteristic 168 and signal characteristic 169 are signal strength (RSSI) and time-of-arrival (TOA) information as well as the access point SSID. The received GPS composite digital signal and the detected wireless signal characteristics from Wi-Fi AP 166 and Wi-Fi AP 167 are combined to create a survey 145. Survey 145 is transmitted to hybrid location system 160, where GPS signal processor 164 processes the GPS composite digital signal to derive the observation set from the GPS signal that was part of survey 145. The processed surveys, including the 1) observation set, and 2) signal characteristics from Wi-Fi AP 166 and Wi-Fi AP 167, are forwarded to database 161. As an alternate implementation, sensor 162 contains a GPS signal processor capable of locally deriving the observation set from the GPS composite digital signal. In this case, survey 145, including the observation set and signal characteristics from Wi-Fi AP 166 and Wi-Fi AP 167, are transmitted from sensor 162 to hybrid location system 160.

FIG. 13b describes how a location coordinate for a hybrid location system subscriber device is determined as per one embodiment of the present invention. In general, the location coordinates of hybrid location system subscriber device 172 is determined by utilizing observation sets from previously obtained surveys stored in database 161, wherein the selection is based on the determination that the sensors obtained the surveys while located where the subscriber is currently located. The selected observation sets and associated navigational equations (or geometric facts using a geometric equation) are used to derive the location coordinates of the subscriber device. Subscriber device 172 is able to detect the broadcasted signals from nearby Wi-Fi access points, including characteristic 180 from Wi-Fi AP 177, characteristic 181 from Wi-Fi AP 178, and characteristic 182 from Wi-Fi AP 179. The detected Wi-Fi signal characteristics are transmitted to the hybrid location system 160. The detected Wi-Fi signal characteristics from subscriber device 172 are compared to surveys contained in database 161. Surveys, that share similar Wi-Fi signal characteristics are selected, as this would indicate that the sensors were near or at the same location where subscriber device 172 is currently located. The observation sets from the selected surveys are used together to derive the location coordinates for subscriber device 172 by location coordinate generator 176. The resulting location coordinates are transmitted back to subscriber device 172 representing its approximate location. Furthermore, if subscriber device 172 is equipped with a GPS receiver (not shown), and is capable of acquiring an observation set, the associated navigational equations or geometric fact may be used together with the observation sets from the selected surveys. This would enhance the accuracy of the resulting location coordinate for subscriber device 172 as well as provide hybrid location system 160 with an additional survey.

FIG. 14 describes a non-limiting example of a hybrid location system as enabled by the present invention. Subscriber device 185 detects RSSI 188 from Wi-Fi access point 186 and RSSI 189 from Wi-Fi access point 187. This information is forwarded to the hybrid location system (not shown). The hybrid location system has identified three surveys in its database that exhibited the same signal characteristics as those observed by subscriber device 185, concluding that subscriber device 185 is at or near the location where the sensors were located when they obtained the surveys. Once the three surveys have been selected, the navigational equations derived from the observation sets that are part of the selected surveys are used in a similar manner as described above for determining the location coordinates of a receiver. The main difference is that a different sensor device may have received each observation set. The navigational equations for this non-limiting example are represented by the following:

Observation set 1 received at time T_1 by sensor Q, containing acquired satellite A and satellite B $$P_Q^A = [(X^A - X)^2 + (Y^A - Y)^2 + (Z^A - Z)^2]^{0.5} + c(dt_Q - dt^A) + T_Q^A + I_Q^A + e_Q^A \quad \text{Equation 1}$$

$X^A$, $Y^A$, $Z^A$=location coordinates of acquired satellite A
X, Y, Z=location coordinates of sensor Q
c=speed of light
$dt_Q$=sensor Q clock offset at time T_1
$dt^A$=clock offset of satellite A at time T_1
$T_Q^A$=tropospheric offset
$I_Q^A$=ionospheric offset
$e_Q^A$=measurement error $$P_Q^B = [(X^B - X)^2 + (Y^B - Y)^2 + (Z^B - Z)^2]^{0.5} + c(dt_Q - dt^B) + T_Q^B + I_Q^B + e_Q^B \quad \text{Equation 2}$$

$X^B$, $Y^B$, $Z^B$=location coordinates of acquired satellite B
X, Y, Z=location coordinates of sensor Q
c=speed of light
$dt_Q$=sensor Q clock offset at time T_1
$dt^B$=clock offset of satellite B at time T_1
$T_Q^B$=tropospheric offset
$I_Q^B$=ionospheric offset
$e_Q^B$=measurement error Observation set 2 received at time T_2 by sensor R, containing acquired satellite C and satellite D $$P_R^C = [(X^C - X)^2 + (Y^C - Y)^2 + (Z^C - Z)^2]^{0.5} + c(dt_R - dt^C) + T_R^C + I_R^C + e_R^C \quad \text{Equation 3}$$

$X^C$, $Y^C$, $Z^C$=location coordinates of acquired satellite C
X, Y, Z=location coordinates of sensor R
c=speed of light
$dt_R$=sensor R clock offset at time T_2
$dt^C$=clock offset of satellite C at time T_2
$T_R^C$=tropospheric offset
$I_R^C$=ionospheric offset
$e_R^C$=measurement error $$P_R^D = [(X^D - X)^2 + (Y^D - Y)^2 + (Z^D - Z)^2]^{0.5} + c(dt_R - dt^D) + T_R^D + I_R^D + e_R^D \quad \text{Equation 4}$$

$X^D$, $Y^D$, $Z^D$=location coordinates of acquired satellite D
X, Y, Z=location coordinates of sensor R
c=speed of light
$dt_R$=sensor R clock offset at time T_2
$dt^D$=clock offset of satellite D at time T_2
$T_R^D$=tropospheric offset
$I_R^D$=ionospheric offset
$e_R^D$=measurement error Observation set 3 received at time T_3 by sensor S, containing acquired satellite E and satellite F $$P_S^E = [(X^E - X)^2 + (Y^E - Y)^2 + (Z^E - Z)^2]^{0.5} + c(dt_S - dt^E) + T_S^E + I_S^E + e_S^E \quad \text{Equation 5}$$

$X^E$, $Y^E$, $Z^E$=location coordinates of acquired satellite E
X, Y, Z=location coordinates of sensor S
c=speed of light
$dt_S$=sensor S clock offset at time T_3
$dt^E$=clock offset of satellite E at time T_3
$T_S^E$=tropospheric offset
$I_S^E$=ionospheric offset
$e_S^E$=measurement error $$P_S^F = [(X^F - X)^2 + (Y^F - Y)^2 + (Z^F - Z)^2]^{0.5} + c(dt_S - dt^F) + T_S^F + I_S^F + e_S^F \quad \text{Equation 6}$$

$X^F$, $Y^F$, $Z^F$=location coordinates of acquired satellite F
X, Y, Z=location coordinates of sensor S
c=speed of light
$dt_S$=sensor S clock offset at time T_3
$dt^F$=clock offset of satellite F at time T_3
$T_S^F$=tropospheric offset
$I_S^F$=ionospheric offset
$e_S^F$=measurement error As it has been determined by the hybrid location system that the current location of subscriber device 185 is the same or in close proximity to where sensor Q obtained observation set 1, sensor R obtained observation set 2, and sensor S obtained observation set 3, X, Y and Z are common variables, resulting in three location unknowns (X, Y, and Z) and three receiver clock offset unknowns ($dt_Q$, $dt_R$, and $dt_S$). The six navigational equations are used to solve for unknowns X, Y, Z, and $dt_Q$ $dt_R$ $dt_S$. If the three observation sets do not converge to a single point, a number of well-understood methods such as least squares fit may be employed.

Furthermore, as there are a number of GNS systems available, surveys received by sensors containing observation sets from different GNS systems may be used together in order to derive the location coordinates of a subscriber device. For example, surveys containing navigational equations from observation sets obtained from the NAVSTAR GNSS may be used together with surveys containing navigational equations from observation sets obtained from the Galileo GNSS in order to derive the location coordinates of a subscriber device.

FIG. 14 also illustrates how this may also be solved geometrically using geometric facts; observation set 1 expressed as surface T_1 190, observation set 2, expressed as surface T_2 191, and observation set 3 expressed as surface T_3 192. Using a geometric equation, the location coordinates of subscriber device 185 may be determined by solving for the intersection point of the three surfaces. If the three surfaces do not converge to a single point, a number of well-understood methods such as least squares fit may be employed.

Furthermore, as there are a number of GNS systems available, surveys received by sensors containing observation sets expressed as geometric facts from different GNS systems may be employed in order to derive the location coordinates of a subscriber device. For example, surveys containing observation sets expressed as geometric facts from the NAVSTAR GNSS may be used together with surveys containing observation sets expressed as geometric facts from the Galileo GNSS in order to derive the location coordinates of a subscriber device.

To further improve the reliability and accuracy of the hybrid location system of determining location coordinates of subscriber devices, the present invention allows for the use of non-GPS ranging information together with observation sets. This includes but not limited to ranging information from Wi-Fi devices, Bluetooth devices, Zigbee devices, broadcast transmitters, and cellular transmitters. Furthermore, ranging metrics may include received signal strength indication (RSSI) and/or time of arrival (TOA).

As mentioned, the present invention allows for the use of observation sets with two or more acquired satellites. However, if the local clock offset of the receiver or sensor is known, or is synchronized with the GPS satellites, an observation set can be derived with one acquired satellite, as $dt_j$ would be known.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalent

We claim:

1. A method of combining non-concurrent pseudoranges, comprising:

obtaining a plurality of non-concurrent pseudorange sets corresponding to a common location, wherein each set comprises a concurrent pair of pseudoranges or a concurrent triplet of pseudoranges;

solving for at least a 2D position of the common location using the plurality of non-concurrent pseudoranges, wherein obtaining at least one of the pseudoranges in the non-concurrent pseudorange sets comprises:

at the common location, sampling a series of received pseudorandom noise (PRN) sequences from a first satellite for a satellite positioning system (SPS) at an SPS sampling rate to provide first time samples extending across a plurality of navigation bit boundaries;

generating samples of a replica PRN sequence for the first satellite at the SPS sampling rate to provide perfect reference time samples extending across the plurality of navigation bit boundaries;

in a processor, re-sampling the first time samples at each of a plurality of re-sampled sampling rates to form corresponding re-sampled sets of time samples;

in a correlator, coherently cross-correlating each of the re-sampled sets of time samples with the perfect reference samples to form corresponding coherent sums:

in a detection module, testing each coherent sum to find a cross-correlation peak and determine an arrival time for the received PRN sequence.

2. The method of claim 1, wherein solving for at least a 2D position comprises solving for a 3D position of the common location.

3. The method of claim 1, wherein each non-concurrent pseudorange set comprises a concurrent pair of pseudoranges.

* * * * *